United States Patent
Okada et al.

(10) Patent No.: US 10,242,809 B2
(45) Date of Patent: Mar. 26, 2019

(54) NON-AQUEOUS LITHIUM-TYPE POWER STORAGE ELEMENT

(71) Applicant: Asahi Kasei Kabushiki Kaisha, Tokyo (JP)

(72) Inventors: Nobuhiro Okada, Tokyo (JP); Yusuke Yamahata, Tokyo (JP); Kensuke Niimura, Tokyo (JP); Yuima Kimura, Tokyo (JP); Osamu Saito, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 133 days.

(21) Appl. No.: 15/037,102

(22) PCT Filed: Nov. 18, 2014

(86) PCT No.: PCT/JP2014/080515
§ 371 (c)(1),
(2) Date: May 17, 2016

(87) PCT Pub. No.: WO2015/076261
PCT Pub. Date: May 28, 2015

(65) Prior Publication Data
US 2016/0300667 A1    Oct. 13, 2016

(30) Foreign Application Priority Data

Nov. 19, 2013 (JP) .................................. 2013-238982
Nov. 19, 2013 (JP) .................................. 2013-239001

(51) Int. Cl.
*H01G 11/34* (2013.01)
*H01G 11/06* (2013.01)
(Continued)

(52) U.S. Cl.
CPC ............. *H01G 11/34* (2013.01); *H01G 11/06* (2013.01); *H01G 11/24* (2013.01); *H01G 11/30* (2013.01);
(Continued)

(58) Field of Classification Search
CPC ........ H01G 11/34; H01G 11/06; H01G 11/24; H01G 11/30; H01G 11/32; H01G 11/50;
(Continued)

(56) References Cited

U.S. PATENT DOCUMENTS

| 6,033,809 A | 3/2000 | Hamamoto et al. |
| 6,479,192 B1 * | 11/2002 | Chung ................. C07D 317/34 429/331 |

(Continued)

FOREIGN PATENT DOCUMENTS

| CN | 102789901 A | 11/2012 |
| JP | 2000-003724 A | 1/2000 |

(Continued)

OTHER PUBLICATIONS

Partial Supplementary European Search Report issued in corresponding European Patent Application No. 14863682.2 dated Oct. 31, 2016.

(Continued)

*Primary Examiner* — Dion Ferguson
(74) *Attorney, Agent, or Firm* — Morgan, Lewis & Bockius LLP

(57) ABSTRACT

A non-aqueous lithium-type power storage element comprising an electrode laminate body and a non-aqueous electrolyte being housed in an external body, the electrode laminate body having a negative electrode body, a positive electrode body and a separator.

24 Claims, 1 Drawing Sheet

(51) Int. Cl.
*H01G 11/24* (2013.01)
*H01G 11/32* (2013.01)
*H01G 11/62* (2013.01)
*H01G 11/64* (2013.01)
*H01M 10/052* (2010.01)
*H01M 10/0567* (2010.01)
*H01M 10/0569* (2010.01)
*H01G 11/50* (2013.01)
*H01G 11/30* (2013.01)
*H01G 11/52* (2013.01)
*H01M 10/04* (2006.01)
*H01M 10/0525* (2010.01)

(52) U.S. Cl.
CPC .............. *H01G 11/32* (2013.01); *H01G 11/50* (2013.01); *H01G 11/52* (2013.01); *H01G 11/62* (2013.01); *H01G 11/64* (2013.01); *H01M 10/0413* (2013.01); *H01M 10/052* (2013.01); *H01M 10/0525* (2013.01); *H01M 10/0567* (2013.01); *H01M 10/0569* (2013.01); *H01M 2220/20* (2013.01); *Y02E 60/13* (2013.01); *Y02T 10/7011* (2013.01); *Y02T 10/7022* (2013.01)

(58) Field of Classification Search
CPC ........ H01G 11/52; H01G 11/62; H01G 11/64; H01M 10/0413; H01M 10/052; H01M 10/0525; H01M 10/0567; H01M 10/0569; H01M 2220/20; Y02E 60/13; Y02T 10/7011; Y02T 10/7022
See application file for complete search history.

(56) References Cited

U.S. PATENT DOCUMENTS

| | | | |
|---|---|---|---|
| 2004/0043300 A1 | 3/2004 | Utsugi et al. | |
| 2009/0174986 A1 | 7/2009 | Matsui et al. | |
| 2010/0255356 A1 | 10/2010 | Fujii et al. | |
| 2012/0293916 A1 | 11/2012 | Lee et al. | |
| 2012/0321965 A1 | 12/2012 | Fujikawa et al. | |
| 2013/0171502 A1* | 7/2013 | Chen ...................... | H01G 11/06 429/149 |
| 2013/0280600 A1 | 10/2013 | Uehara et al. | |
| 2014/0134477 A1 | 5/2014 | Kuriyama et al. | |

FOREIGN PATENT DOCUMENTS

| | | | |
|---|---|---|---|
| JP | 2002-329528 | A | 11/2002 |
| JP | 2003-346801 | A | 12/2003 |
| JP | 2004-235144 | A | 8/2004 |
| JP | 2006-286924 | A | 10/2006 |
| JP | 2006-286926 | A | 10/2006 |
| JP | 2009-245828 | A | 10/2009 |
| JP | 2010-267875 | A1 | 11/2010 |
| JP | 2012-038900 | A | 2/2012 |
| JP | 2012-089352 | A | 5/2012 |
| JP | 2012-244171 | A | 12/2012 |
| JP | 2013-055285 | A | 3/2013 |
| JP | 2013-219152 | A | 10/2013 |
| JP | 2014-027196 | A | 2/2014 |
| WO | 2013/137418 | A1 | 9/2013 |

OTHER PUBLICATIONS

International Search Report issued in corresponding International Patent Application No. PCT/JP2014/080515 dated Feb. 24, 2015.
Lippens et al., "Studies on Pore Systems in Catalysts,: V The t Method" Journal of Catalysis, 4: 319-323 (1965).
Mikhail et al., "Investigations of a Complete Pore Structure Analysis: I. Analysis of Micropores," Journal of Colloid and Interface Science, 26: 45-53 (1968).
Barrett et al., "The Determination of Pore Volume and Area Distributions in Porous Substances. I. Computations from Nitrogen Isotherms," Journal of the American Chemical Society, 73: 373-380 (1951).
International Preliminary Report on Patentability issued in corresponding International Patent Application No. PCT/JP2014/080515 dated Jun. 2, 2016.
Supplementary European Search Report issued in corresponding European Patent Application No. 14863682.2 dated Apr. 6, 2017.

* cited by examiner

NON-AQUEOUS LITHIUM-TYPE POWER STORAGE ELEMENT

TECHNICAL FIELD

The present invention relates to a non-aqueous lithium-type power storage element.

BACKGROUND ART

In recent years, with an aim toward effective utilization of energy for greater environmental conservation and reduced usage of resources, a great deal of attention is being directed to power storage systems for electric vehicles, overnight charging electric power storage systems, and household dispersed power storage systems based on photovoltaic power generation technology.

The first requirement for such power storage systems is high energy density of the power storage elements used in them. The development of lithium ion batteries is advancing at a rapid pace, as an effective strategy for power storage elements with high energy density that can meet this requirement.

The second requirement is high output characteristics. For example, in a combination of a high efficiency engine and a power storage system (such as in a hybrid electric vehicle), or a combination of a fuel cell and a power storage system (such as in a fuel cell electric vehicle), high output discharge characteristics are required for the power storage system during acceleration.

Electrical double layer capacitors and nickel hydrogen cells are currently under development as high output power storage elements.

Electrical double layer capacitors that employ activated carbon in the electrodes have output characteristics of about 0.5 to 1 kW/L. Such electrical double layer capacitors have high durability (especially cycle characteristics and high-temperature storage characteristics), and have been considered optimal power storage elements for fields requiring the high output mentioned above. However, their low energy density of about 1 to 5 Wh/L and short output duration have been obstacles to their practical use.

On the other hand, nickel hydrogen cells employed in current hybrid electric vehicles exhibit high output equivalent to electrical double layer capacitors, and have energy density of about 160 Wh/L. Still, research is being actively pursued toward further increasing their energy density and output, further improving their stability at high temperatures, and increasing their durability.

Research is also advancing toward increased outputs for lithium ion batteries as well. For example, lithium ion batteries are being developed that yield high output exceeding 3 kW/L at 50% depth of discharge (a value representing how deeply the element is discharged). However, the energy density is 100 Wh/L or less, and the design is such that high energy density, as the major feature of a lithium ion battery, is reduced. The durability (especially cycle characteristics and high-temperature storage characteristics) is inferior to that of an electrical double layer capacitor. In order to provide practical durability for a lithium ion battery, therefore, they can only be used with a depth of discharge in a narrower range than 0 to 100%. Because the usable capacity is even lower, research is actively being pursued toward further increasing durability.

There is strong demand for implementation of power storage elements exhibiting high power density, high energy density and durability, as mentioned above, but the aforementioned existing power storage elements have their advantages and disadvantages. New power storage elements that satisfy these technical requirements are therefore desired, and power storage elements known as lithium ion capacitors are being development in recent years as promising candidates.

Lithium ion capacitors are a type of power storage element using a non-aqueous electrolyte comprising a lithium ion-containing electrolyte (or, "non-aqueous lithium-type power storage element"), wherein charge-discharge is accomplished by:

non-Faraday reaction by adsorption/desorption of anion similar to an electrical double layer capacitor, at the positive electrode, and Faraday reaction by occlusion/release of lithium ion similar to a lithium ion battery, at the negative electrode.

An electrical double layer capacitor in which charge-discharge is accomplished by non-Faraday reaction at both the positive electrode and negative electrode has excellent output characteristics, but low energy density. On the other hand, a lithium ion battery that is a secondary battery in which charge-discharge is accomplished by Faraday reaction at both the positive electrode and negative electrode has excellent energy density but poor output characteristics. A lithium ion capacitor is a new power storage element that aims to achieve both excellent output characteristics and high energy density by accomplishing charge-discharge by non-Faraday reaction at the positive electrode and Faraday reaction at the negative electrode.

The purposes for which lithium ion capacitors are used may be electricity storage for, for example, railways, construction machines and automobiles. For such purposes, it is necessary for the capacitors used to have excellent temperature characteristics because of the harsh operating environments. In particular, performance impairment has been a problem caused by gas emissions due to decomposition of the electrolyte at high temperature. As countermeasures against this problem, there have been proposed lithium ion capacitors containing fluorinated cyclic carbonates in the electrolyte (see PTLs 1 and 2). Lithium ion capacitors containing vinylene carbonate or its derivatives in the electrolyte have also been proposed (see PTL 3). Another technology that has been proposed is that of power storage elements containing lithium bis(oxalato)borate in the electrolyte (see PTL 4). Lithium ion secondary batteries containing 1,3-propane sultone and/or 1,4-butane sultone in the electrolyte have been proposed as well (see PTL 5).

CITATION LIST

Patent Literature

[PTL 1] Japanese Unexamined Patent Publication No. 2006-286926
[PTL 2] Japanese Unexamined Patent Publication No. 2013-55285
[PTL 3] Japanese Unexamined Patent Publication No. 2006-286924
[PTL 4] Japanese Unexamined Patent Publication No. 2012-38900
[PTL 5] Japanese Unexamined Patent Publication No. 2000-3724

DISCLOSURE OF THE INVENTION

Problems to be Solved by the Invention

The technology of PTL 1 can provide superior characteristics at low temperature, but no effect of improved durability at high temperature has been confirmed. In PTLs 2 and 4, the technology reduces gas generated in the process of fabricating the capacitor, thereby improving the initial properties, but effects of improved durability at high temperature in the completed capacitors has not been confirmed. In PTL 3 there is provided a capacitor with high capacity retention during continuous charge of the power storage element at high temperature. However, PTL 3 does not indicate the results for changes in characteristics after high temperature testing. PTL 5 describes improvement in the charge-discharge cycle characteristics of a lithium ion secondary battery by addition of 1,3-propane sultone to the electrolyte, but it does not indicate the results obtained for changes in characteristics at high temperature, nor does it mention the function of 1,3-propane sultone.

Thus, no technology has yet been found for avoiding the reduction in performance caused by generation of gas due to decomposition of the electrolyte at high temperature, in conventional lithium ion capacitors. The function of sultone compounds is also poorly understood, and no technology has been discovered for quantitatively specifying such function.

In light of these circumstances, it is an object of the present invention to provide a non-aqueous lithium-type power storage element that exhibits both high input/output characteristics and high durability at high temperatures (for example, 40 to 90° C.)

Means for Solving the Problems

The present inventors have conducted much diligent experimentation with the aim of solving the problems described above. As a result, the invention has been completed upon finding that by adding at least one type of sulfonic acid derivative or sulfurous acid derivative to the negative electrode active material layer, it is possible to simultaneously achieve both high input/output characteristics, and prevention of the reduction in performance caused by gas generation by decomposition of the electrolyte at high temperature.

Specifically, the present invention provides the following.

[1] A non-aqueous lithium-type power storage element comprising an electrode laminate body having a negative electrode body, a positive electrode body and a separator, and a non-aqueous electrolyte, housed in an external body, wherein the negative electrode body has a negative current collector, and a negative electrode active material layer that includes a negative electrode active material and that is provided on one or both surfaces of the negative current collector, the negative electrode active material including a carbon material that can occlude and release lithium ions, the positive electrode body has a positive current collector, and a positive electrode active material layer that includes a positive electrode active material and that is provided on one or both surfaces of the positive current collector, the positive electrode active material including activated carbon, the non-aqueous electrolyte contains a lithium salt at 0.5 mol/L or greater based on the total amount of the non-aqueous electrolyte, and the negative electrode active material layer includes at least one type of sulfur compound selected from the group consisting of sulfonic acid derivatives represented by the following formulas (1) and (2), and sulfurous acid derivatives represented by the following formulas (3) and (4), the total amount of sulfonic acid derivatives and sulfurous acid derivatives being $2.6 \times 10^{-6}$ mol/g to $2{,}000 \times 10^{-6}$ mol/g per unit weight of the negative electrode active material.

[Chemical Formula 1]

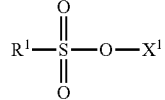

(1)

{In formula (1), $R^1$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^1$ represents hydrogen, lithium or a C1-12 alkyl group.}

[Chemical Formula 2]

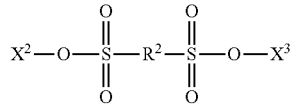

(2)

{In formula (2), $R^2$ represents a C1-24 alkyl group, a C1-24 mono or polyhydroxyalkyl group or its lithium alkoxide, a C2-24 alkenyl group, a C2-24 mono or polyhydroxyalkenyl group, a C3-6 cycloalkyl group, or an aryl group, and $X^2$ and $X^3$ each independently represent hydrogen, lithium or a C1-12 alkyl group.}

[Chemical Formula 3]

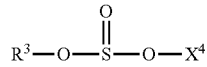

(3)

{In formula (3), $R^3$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^4$ represents hydrogen, lithium or a C1-12 alkyl group.}

[Chemical Formula 4]

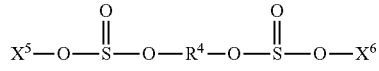

(4)

{In formula (4), $R^4$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^5$ and $X^6$ each independently represent hydrogen, lithium or a C1-12 alkyl group.}

[2] A non-aqueous lithium-type power storage element according to [1], wherein the negative electrode active material is a composite porous carbon material obtained by coating the surface of activated carbon with a carbonaceous material.

[3] A non-aqueous lithium-type power storage element according to [1], wherein the sulfur compound is selected from among sulfonic acid derivatives represented by formula (1) and formula (2), and in formula (1), $R^1$ represents a C1-24 alkyl group, C2-24 alkenyl group, C3-6 cycloalkyl group or aryl group, and $X^1$ represents hydrogen, lithium or a C1-12 alkyl group, and in formula (2), $R^2$ represents a C1-24 alkyl group, C2-24 alkenyl group, C3-6 cycloalkyl group or aryl group, and $X^2$ and $X^3$ each independently represent hydrogen, lithium or a C1-12 alkyl group.

[4] A non-aqueous lithium-type power storage element according to [1], wherein the sulfur compound is a sulfonic acid derivative represented by formula (1), and in formula (1), $R^1$ represents a C3-4 alkyl group, a C3-4 mono or polyhydroxyalkyl group or its lithium alkoxide, a C3-4 alkenyl group or a C3-4 mono or polyhydroxyalkenyl group or its lithium alkoxide, and $X^1$ represents hydrogen, lithium or a C1-2 alkyl group.

[5] A non-aqueous lithium-type power storage element according to [1], wherein the sulfur compound is a sulfonic acid derivative selected from the group consisting of compounds represented by $C_3H_7SO_3X^1$ and $C_3H_5SO_3X^1$ {wherein $X^1$ is hydrogen, lithium or a C1-2 alkyl group}, and compounds represented by $X^2O_3SC_6H_{12}SO_3X^3$ and $X^2O_3SC_6H_8SO_3X^3$ {wherein $X^2$ and $X^3$ each independently represent hydrogen, lithium or a C1-2 alkyl group}.

[6] A non-aqueous lithium-type power storage element according to any one of [1] to [5], wherein the total amount of sulfur compounds in the negative electrode active material layer is $3.0 \times 10^{-6}$ mol/g to $870 \times 10^{-6}$ mol/g per unit weight of the negative electrode active material.

[7] A non-aqueous lithium-type power storage element according to any one of [1] to [5], wherein the total amount of sulfur compounds in the negative electrode active material layer is $15.7 \times 10^{-6}$ mol/g to $770 \times 10^{-6}$ mol/g per unit weight of the negative electrode active material.

[8] A non-aqueous lithium-type power storage element according to any one of [1] to [7], wherein the non-aqueous electrolyte contains a linear carbonate at 20 vol % or greater with respect to the total amount excluding lithium salts.

[9] A non-aqueous lithium-type power storage element according to any one of [1] to [8], wherein the negative electrode active material layer includes at least one compound selected from among

{wherein $X^7$ represents $—(COO)_nLi$ (where n is 0 or 1)}, and

{wherein $X^8$ represents $—(COO)_nLi$ (where n is 0 or 1), at $7.8 \times 10^{-4}$ mol/g or less per unit weight of the negative electrode active material.

[10] A non-aqueous lithium-type power storage element comprising an electrode laminate body having a negative electrode body, a positive electrode body and a separator, and a non-aqueous electrolyte, housed in an external body, wherein the negative electrode body has a negative current collector, and a negative electrode active material layer that includes a negative electrode active material and that is provided on one or both surfaces of the negative current collector, the negative electrode active material including a carbon material that can occlude and release lithium ions, the positive electrode body has a positive current collector, and a positive electrode active material layer that includes a positive electrode active material and that is provided on one or both surfaces of the positive current collector, the positive electrode active material including activated carbon, the non-aqueous electrolyte contains a lithium salt at 0.5 mol/L or greater based on the total amount of the non-aqueous electrolyte, the negative electrode active material layer includes at least one type of sulfur compound among sulfonic acid derivatives represented by each of the following formulas (1) and (2) and sulfurous acid derivatives represented by each of the following formulas (3) and (4), and the non-aqueous electrolyte contains at least one type of sultone compound represented by each of the following formulas (9) to (11), at 0.25 wt % to 20 wt % with respect to the total non-aqueous electrolyte.

[Chemical Formula 5]

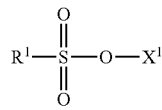

(1)

{In formula (1), $R^1$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^1$ represents hydrogen, lithium or a C1-12 alkyl group.}

[Chemical Formula 6]

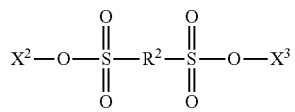

(2)

{In formula (2), $R^2$ represents a C1-24 alkyl group, a C1-24 mono or polyhydroxyalkyl group or its lithium alkoxide, a C2-24 alkenyl group, a C2-24 mono or polyhydroxyalkenyl group, a C3-6 cycloalkyl group, or an aryl group, and $X^2$ and $X^3$ each independently represent hydrogen, lithium or a C1-12 alkyl group.}

[Chemical Formula 7]

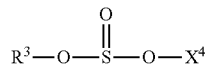

(3)

{In formula (3), $R^3$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^4$ represents hydrogen, lithium or a C1-12 alkyl group.}

[Chemical Formula 8]

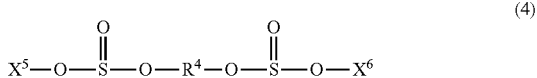
(4)

{In formula (4), $R^4$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^5$ and $X^6$ each independently represent hydrogen, lithium or a C1-12 alkyl group.}

[Chemical Formula 9]

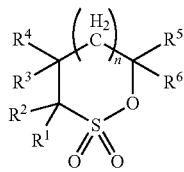
(9)

{In formula (9), $R^1$-$R^6$ each independently represent hydrogen, a halogen atom or a C1-12 alkyl group optionally including a halogen atom, and n is an integer of 0 to 3.}

[Chemical Formula 10]

(10)

{In formula (10), $R^1$-$R^4$ each independently represent hydrogen, a halogen atom or a C1-12 alkyl group optionally including a halogen atom, and n is an integer of 0 to 3.}

[Chemical Formula 11]

(11)

{In formula (11), $R^1$-$R^6$ each independently represent hydrogen, a halogen atom or a C1-6 alkyl group optionally including a halogen atom.}

[11] A non-aqueous lithium-type power storage element according to [10], wherein the compound represented by formula (9) is 1,3-propane sultone, 2,4-butane sultone, 1,4-butane sultone, 1,3-butane sultone or 2,4-pentane sultone, the compound represented by formula (10) is 1,3-propene sultone or 1,4-butene sultone, and the compound represented by formula (11) is 1,5,2,4-dioxadithiepane 2,2,4,4-tetraoxide (cyclodisone).

[12] A non-aqueous lithium-type power storage element according to [10] or [11], wherein the non-aqueous electrolyte further contains at least one compound selected from the group consisting of phosphazenes represented by the following formula (12):

[Chemical Formula 12]

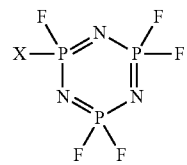
(12)

{In formula (12), X represents fluorine or an alkoxy or aryloxy group}, acyclic fluoroethers represented by the following formula (13):

(13)

{wherein $R^1$ and $R^2$ each independently represent a C2-6 fluorinated alkyl group}, fluorine-containing cyclic carbonates, and vinylene carbonate.

[13] A non-aqueous lithium-type power storage element according to any one of [1] to [12], wherein the lithium salt is $LiPF_6$.

[14] A non-aqueous lithium-type power storage element according to any one of [1] to [13], wherein the negative electrode active material satisfies the inequalities $0.010 \leq Vm1 \leq 0.250$, $0.001 \leq Vm2 \leq 0.200$ and $1.5 \leq Vm1/Vm2 \leq 20.0$, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

[15] A non-aqueous lithium-type power storage element according to any one of [1] to [13], wherein the negative electrode active material is a composite porous material obtained by coating the surface of activated carbon with a carbonaceous material, the composite porous material is doped with lithium ion at between 1,050 mAh/g and 2,050 mAh/g, inclusive, per unit weight of the composite porous material, the weight ratio of the carbonaceous material with respect to the activated carbon is between 10% and 60%, inclusive, and the thickness of the negative electrode active material layer is between 20 μm and 45 μm per side.

[16] A non-aqueous lithium-type power storage element according to any one of [1] to [15], wherein the positive electrode active material is activated carbon satisfying the inequalities $0.3 < V1 \leq 0.8$ and $0.5 \leq V2 \leq 1.0$, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 1,500 m²/g and 3,000 m²/g, inclusive, as measured by the BET method.

[17] A non-aqueous lithium-type power storage element according to any one of [1] to [15], wherein the positive electrode active material is activated carbon in which the mesopore volume V1 (cc/g) due to pores with diameters of between 20 angstrom and 500 angstrom, inclusive, as calculated by the BJH method satisfies the inequality $0.8 < V1 \leq 2.5$, the micropore volume V2 (cc/g) due to pores with diameters of smaller than 20 angstrom as calculated by the MP method satisfies the inequality $0.8 < V2 \leq 3.0$, and a specific surface area is between 3,000 m$^2$/g and 4,000 m$^2$/g, inclusive, as measured by the BET method.

[18] A non-aqueous lithium-type power storage element comprising an electrode laminate body having a negative electrode body, a positive electrode body and a separator, and a non-aqueous electrolyte, housed in an external body, wherein the negative electrode body has a negative current collector, a negative electrode active material layer that includes a negative electrode active material and that is provided on one or both surfaces of the negative current collector, the negative electrode active material including a carbon material that can occlude and release lithium ions, the positive electrode body has a positive current collector and a positive electrode active material layer that includes a positive electrode active material and that is provided on one or both surfaces of the positive current collector, the positive electrode active material including activated carbon, the non-aqueous electrolyte contains a lithium salt at 0.5 mol/L or greater based on the total amount of the non-aqueous electrolyte, the negative electrode active material layer includes at least one type of sulfur compound selected from the group consisting of sulfonic acid derivatives and sulfurous acid derivatives, the product of the electrostatic capacity F (F) and the internal resistance R (Ω) of the non-aqueous lithium-type power storage element (R·F (ΩF)) is no greater than 2.4, and the gas quantity generated when the non-aqueous lithium-type power storage element has been stored for 2 months at a cell voltage of 4.0 V and in an environmental temperature of 60° C., is no greater than $13 \times 10^{-3}$ cc/F at 25° C.

Effect of the Invention

The non-aqueous lithium-type power storage element of the invention exhibits both high input/output characteristics and high durability at high temperatures.

The non-aqueous lithium-type power storage element is suitable as a lithium ion capacitor for purposes in the field of hybrid drive systems that combine automobile internal combustion engines, fuel cells or motors with power storage elements; and in assist power sources for instantaneous electric power peaks.

DESCRIPTION OF THE PREFERRED EMBODIMENTS

Figure 1:
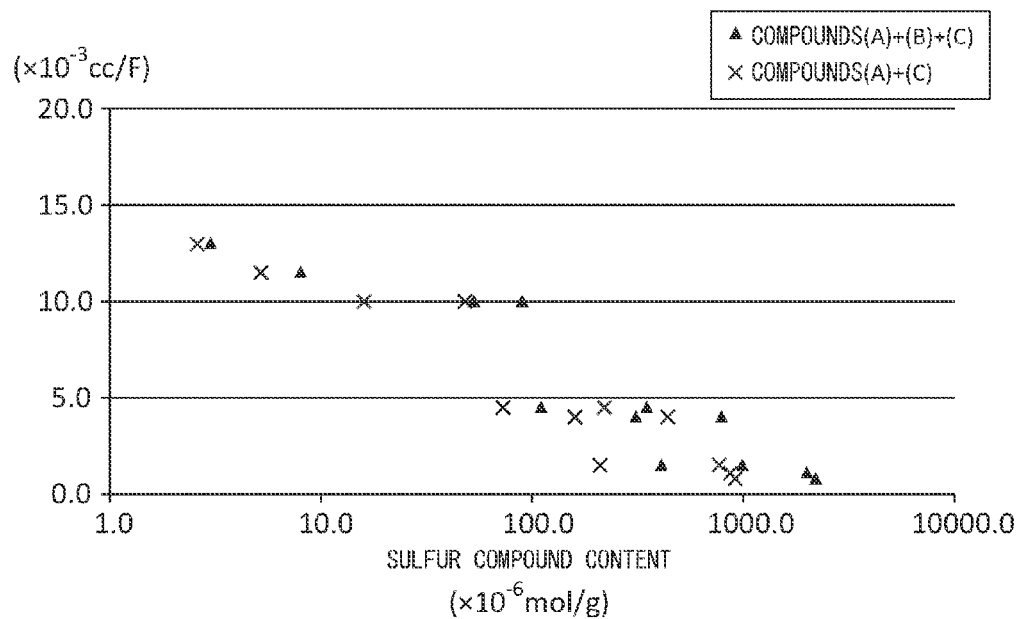
FIG. 1 is a graph showing the relationship between sulfur compound content in a negative electrode active material layer, and gas generation volume after 2 months of storage of a power storage element obtained in examples.

An embodiment of the invention will be explained in detail, with the understanding that the invention is not limited to the embodiment.

[Power Storage Element]

This embodiment of the invention provides a non-aqueous lithium-type power storage element. The power storage element comprises an electrode laminate body having a negative electrode body, a positive electrode body and a separator, and a non-aqueous electrolyte, housed in an external body.

The negative electrode body has a negative current collector, and a negative electrode active material layer including a negative electrode active material provided on one or both surfaces of the negative current collector. The negative electrode active material includes a carbon material that can occlude and release lithium ions.

The positive electrode body has a positive current collector, and a positive electrode active material layer including a positive electrode active material provided on one or both surfaces of the positive current collector. The positive electrode active material includes activated carbon.

The non-aqueous lithium-type power storage element of this embodiment of the invention preferably has a product R·F, of the electrostatic capacity F (F) and the internal resistance R (Ω) of the power storage element, of no greater than 2.4, and a gas quantity, generated when stored for 2 months at a cell voltage of 4.0 V and in an environmental temperature of 60° C., of no greater than $13 \times 10^{-3}$ cc/F at 25° C.

The electrostatic capacity F (F) is the value calculated by $F = Q/(3.8 - 2.2)$, using the capacity Q with charging to 3.8 V by constant-current/constant-voltage charge ensuring a constant-voltage charge time of 1 hour at a current value of 1.5 C, followed by constant-current discharge to 2.2 V at a current value of 1.5 C. The internal resistance R (Ω) is the value obtained by the following method. First, the constant-current charge is carried out to 3.8 V at a current value of 1.5 C, and then constant-current/constant-voltage charge is carried out with application of a constant voltage of 3.8 V for a total of 2 hours, and followed by constant-current discharge to 2.2 V at a current value of 50 C, and a discharge curve (time-voltage) is obtained. From the discharge curve, with a voltage of E0 at discharge time=0 seconds, obtained by extrapolating an approximate straight line from the voltage values at discharge time points of 2 seconds and 4 seconds, the value is calculated from voltage drop $(\Delta E) = 3.8 - E0$ and $R = \Delta E/(50$ C (current value)).

Regarding the conditions for measuring the gas volume, 2 months storage "at a cell voltage of 4.0 V" means that the cell voltage of 4.0 V was essentially maintained for the 2 month storage period. Specifically, this method maintains a cell voltage of 4.0 V by constant-current/constant-voltage charge with application of a 4.0 V constant voltage with a 1.5 C current for a period of 2 hours, before storage and each week after initial storage.

The product R·F of the electrostatic capacity F (F) and the internal resistance R (Ω) is preferably no greater than 2.4, more preferably no greater than 2.0 and even more preferably no greater than 1.75, from the viewpoint of allowing sufficient charge capacity and service capacity to be exhibited for high current.

The gas quantity generated after storage for 2 months at a cell voltage of 4.0 V and in an environmental temperature of 60° C., as measured at 25° C., is preferably no greater than $13 \times 10^{-3}$ cc/F, more preferably no greater than $10 \times 10^{-3}$ cc/F and even more preferably no greater than $5.0 \times 10^{-3}$ cc/F, from the viewpoint of avoiding reduction in the properties of the element due to the generated gas.

Since the power storage element provided by this embodiment of the invention exhibits the low R·F value and low gas quantity described above, its element characteristics are of a superior level that cannot be obtained in the prior art. The means for achieving such a low R·F value and low gas quantity may be, for example, application of the specific negative electrode active material layer and non-aqueous electrolyte composition explained below.

[Electrolyte]

The electrolyte for this embodiment of the invention is a non-aqueous electrolyte. Specifically, the electrolyte includes a non-aqueous solvent as described below. The non-aqueous electrolyte contains a lithium salt dissolved at a concentration of 0.5 mol/L or greater based on the total amount of the non-aqueous electrolyte. That is, the non-aqueous electrolyte includes lithium ion as an electrolyte.

Examples of suitable lithium salts contained in the non-aqueous electrolyte include $LiPF_6$, $LiBF_4$, $LiN(SO_2C_2F_5)_2$, $LiN(SO_2CF_3)(SO_2C_2F_5)$ and $LiN(SO_2CF_3)(SO_2C_2F_4H)$, as well as mixtures thereof. From the viewpoint of the ability to exhibit high conductivity, the lithium salt preferably includes $LiPF_6$ and/or $LiBF_4$, and most preferably $LiPF_6$.

The lithium salt concentration in the non-aqueous electrolyte is preferably 0.5 mol/L or greater, and more preferably in the range of 0.5 to 2.0 mol/L. If the lithium salt concentration is 0.5 mol/L or greater, anions will be sufficiently present to allow sufficiently high power storage element capacity. The lithium salt concentration is preferably 2.0 mol/L or lower, because this can prevent precipitation of the undissolved lithium salt in the non-aqueous electrolyte and prevent the viscosity of the electrolyte from becoming too high, and will tend to avoid lowering of the conductivity or reduction in the output characteristics as well.

A single lithium salt may be used, or two or more different salts may be used in admixture.

The non-aqueous electrolyte preferably contains a cyclic carbonate and a linear carbonate. If the non-aqueous electrolyte contains a cyclic carbonate and a linear carbonate, this will be advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, methylethyl carbonate, dipropyl carbonate and dibutyl carbonate. A dialkyl carbonate compound will typically be unsubstituted.

The total content of the cyclic carbonate and linear carbonate is preferably 50 wt % or greater and more preferably 65 wt % or greater, and preferably no greater than 95 wt % and more preferably no greater than 90 wt %, based on the total amount of the non-aqueous electrolyte. If the total content is 50 wt % or greater, it will be possible to dissolve the lithium salt to the desired concentration, and to exhibit high lithium ion conductivity. If the total concentration is 95 wt % or lower, the electrolyte may contain other compounds such as phosphazenes that are necessary to exhibit the effect of the invention, and the effect of the invention will not be impaired.

The non-aqueous electrolyte of the invention preferably contains a linear carbonate at between 20 vol % and 80 vol %, inclusive, with respect to the total amount of the electrolyte, excluding the lithium salt. The linear carbonate content is more preferably between 40 vol % and 70 vol %, inclusive, with respect to the total amount of the electrolyte, excluding the lithium salt. If this value is 20 vol % or higher the viscosity of the electrolyte will not become too high and high ionic conductance can be exhibited, and if it is 80 vol % or lower an advantage will be obtained in terms of the flame-retardant effect.

From the viewpoint of exhibiting a high flame-retardant effect, however, the cyclic carbonate content may be 100%, so long as suitable viscosity and ionic conductance can be exhibited.

The non-aqueous electrolyte of the invention contains at least one sultone compound represented by each of the following formulas (9) to (11), at 0.25 wt % to 20 wt % with respect to the total non-aqueous electrolyte.

[Chemical Formula 13]

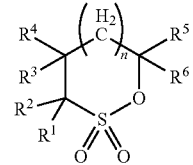

(9)

{In formula (9), $R^1$-$R^6$ each independently represent hydrogen, a halogen atom or a C1-12 alkyl group optionally including a halogen atom, and n is an integer of 0 to 3.}

[Chemical Formula 14]

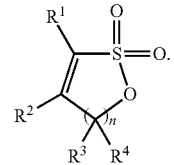

(10)

{In formula (10), $R^1$-$R^4$ each independently represent hydrogen, a halogen atom or a C1-12 alkyl group optionally including a halogen atom, and n is an integer of 0 to 3.}

[Chemical Formula 15]

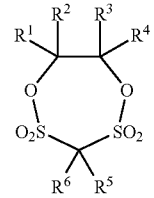

(11)

{In formula (11), $R^1$-$R^6$ each independently represent hydrogen, a halogen atom or a C1-6 alkyl group optionally including a halogen atom.}

While the functions of the sultone compounds represented by each of formula (9), formula (10) and formula (11) are not fully understood, it is conjectured that they provide the advantage of inhibiting decomposition of the non-aqueous electrolyte at high temperature and minimizing gas generation, when a coating film is formed on the electrode surface.

In formula (9), preferably $R^1$-$R^6$ each independently represent hydrogen, a halogen atom or a C1-6 alkyl group optionally including a halogen atom, and n is an integer of 0 to 2. From the viewpoint of further inhibiting increase in resistance with formation of a coating film, $R^1$-$R^6$ in formula (9) are preferably hydrogen, and n is preferably 0 or 1.

From the viewpoint of low contribution to resistance, and the effect of inhibiting decomposition of the non-aqueous electrolyte at high temperature and minimizing gas generation, most preferably:

the sultone compound represented by formula (9) is 1,3-propane sultone, 2,4-butane sultone, 1,4-butane sultone, 1,3-butane sultone or 2,4-pentane sultone, the sultone compound represented by formula (10) is 1,3-propene sultone or 1,4-butene sultone, and the sultone compound represented by formula (11) is 1,5,2,4-dioxadithiepane 2,2,4,4-tetraoxide (cyclodisone).

The content of the one or more sultone compounds represented by each of formula (9), formula (10) and formula (11) may be 0.25 wt % to 20 wt % with respect to the non-aqueous electrolyte. If the content is 0.25 wt % or higher, decomposition of the electrolyte at high temperature can be inhibited and gas generation can be minimized, while if it is 20 wt % or lower, reduction in the ionic conductance of the electrolyte can be minimized and a high input/output characteristic can be retained. For these reasons, the content is preferably between 0.5 wt % and 15 wt %, inclusive and even more preferably between 0.8 wt % and 12 wt %, inclusive.

The sultone compounds represented by each of formula (9), formula (10) and formula (11) may be used alone or in mixtures of two or more.

The non-aqueous electrolyte of the invention preferably contains, as additives, at least one compound selected from the group consisting of phosphazenes represented by the following formula (12):

[Chemical Formula 16]

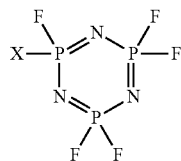

(12)

{In formula (12), X represents fluorine or an alkoxy or aryloxy group}, acyclic fluoroethers represented by the following formula (13):

$R_1$—O—$R^2$ (13)

{in formula (13), $R^1$ and $R^2$ each independently represent a C2-6 fluorinated alkyl group}, fluorine-containing cyclic carbonates and vinylene carbonate.

While the effect of the phosphazene represented by formula (12) is not fully understood, HF generated in the electrolyte is captured, while reaction of phosphazenes on the positive electrode exhibits an effect of protecting the positive electrode, such that an advantage of inhibiting decomposition of the non-aqueous electrolyte at high temperature and minimizing gas generation is provided.

X in formula (12) is preferably a methoxy, ethoxy, propoxy, trifluoromethoxy or 2,2,2-trifluoroethoxy group, as an alkoxy group, or a phenoxy group, as an aryloxy group, from the viewpoint of ease of production and low secondary reactions in the capacitor, so that the charge-discharge reaction of the capacitor is not inhibited. From the viewpoint of electrochemical stability, inhibiting decomposition of the non-aqueous electrolyte at high temperature and minimizing gas generation, the phosphazene represented by formula (12) is most preferably ethoxypentafluorocyclotriphosphazene or phenoxypentafluorocyclotriphosphazene.

The content of the phosphazene represented by formula (12) is preferably 0.5 wt % to 20 wt % with respect to the non-aqueous electrolyte. If it is 0.5 wt % or higher, decomposition of the electrolyte at high temperature can be inhibited and gas generation can be minimized, while if it is 20 wt % or lower, reduction in the ionic conductance of the electrolyte can be minimized and a high input/output characteristic can be retained. For these reasons, the content is preferably between 3 wt % and 15 wt %, inclusive and even more preferably between 5 wt % and 10 wt %, inclusive.

The phosphazene represented by formula (12) may be used alone, or two or more may be used in admixture.

The non-aqueous electrolyte preferably also contains an acyclic fluoroether represented by formula (13) above, as an additive.

$R^1$ and $R^2$ in formula (13) are each a linear or branched fluorinated alkyl group. From the viewpoint of compatibility with the non-aqueous solvent in the non-aqueous electrolyte, the terminal carbon of at least one of $R^1$ and $R^2$ has a hydrogen atom. Specific examples of compounds represented by formula (13) include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, among which $HCF_2CF_2OCH_2CF_2CF_2H$ is preferred from the viewpoint of electrochemical stability.

The content of the acyclic fluoroether represented by formula (13) is preferably between 0.5 wt % and 15 wt %, inclusive, and more preferably between 1 wt % and 10 wt %, inclusive, with respect to the non-aqueous electrolyte. If the acyclic fluoroether content is 0.5 wt % or higher, the stability of the non-aqueous electrolyte against oxidative decomposition will be increased and a power storage element with high durability during high temperature will be obtained. If the acyclic fluoroether content is 15 wt % or lower, on the other hand, satisfactory lithium salt solubility will be retained, and the ionic conductance of the non-aqueous electrolyte will be high, allowing high input/output to be maintained.

The acyclic fluoroether used may be a single type or a mixture of two or more types.

The fluorine-containing cyclic carbonate is preferably fluoroethylene carbonate (FEC) or difluoroethylene carbonate (dFEC), from the viewpoint of compatibility with the non-aqueous solvent in the non-aqueous electrolyte.

The content of the fluorine-containing cyclic carbonate is preferably between 0.5 wt % and 10 wt %, inclusive, and more preferably between 1 wt % and 5 wt %, inclusive, with respect to the non-aqueous electrolyte. If the fluorine-containing cyclic carbonate content is 0.5 wt % or higher, it will be possible to form a satisfactory coating film on the negative electrode, and reductive decomposition of the electrolyte on the negative electrode will be minimized, to obtain a power storage element with high durability at high temperature. If the fluorine-containing cyclic carbonate content is 10 wt % or lower, on the other hand, satisfactory lithium salt solubility will be retained, and the ionic conductance of the non-aqueous electrolyte will be high, allowing a satisfactory input/output characteristic to be maintained.

The fluorine-containing cyclic carbonate may be used as a single type or as a mixture of two or more types.

The content of the vinylene carbonate is preferably between 0.5 wt % and 10 wt %, inclusive, and more preferably between 1 wt % and 5 wt %, inclusive, with respect to the non-aqueous electrolyte. If the vinylene carbonate content is 0.5 wt % or higher, it will be possible to form a satisfactory coating film on the negative electrode, and reductive decomposition of the electrolyte on the negative electrode will be minimized, to obtain a power storage element with high durability at high temperature. If the vinylene carbonate content is 10 wt % or lower, on the other hand, satisfactory lithium salt solubility will be retained, and the ionic conductance of the non-aqueous electrolyte will be high, allowing a satisfactory input/output characteristic to be maintained.

An example of a particularly preferred combination is a combination containing a sultone compound and either or both a phosphazene and an acyclic fluoroether.

[Positive Electrode Body and Negative Electrode Body]

The positive electrode body has a positive current collector, and a positive electrode active material layer including a positive electrode active material provided on one or both surfaces of the positive current collector. The negative electrode body has a negative current collector, and a negative electrode active material layer including a negative electrode active material provided on one or both surfaces of the negative current collector. In the electrode bodies of the positive electrode and negative electrode of this embodiment, the same construction is used for the constituent elements other than the positive electrode active material and the negative electrode active material, and they will be summarized later.

[Positive Electrode Active Material]

The positive electrode active material includes activated carbon. The positive electrode active material used may be activated carbon alone, or another material mentioned below may be used in addition to activated carbon. The activated carbon content based on the total amount of the positive electrode active material is preferably 50 wt % or greater and more preferably 70 wt % or greater. It may even be 100 wt %, but from the viewpoint of obtaining a satisfactory effect by combined used with other materials, it is preferably, for example, no greater than 90 wt %, and may even be 80 wt % or lower.

There are no particular restrictions on the type of activated carbon or its starting material, used as the positive electrode active material, but preferably the pores of the activated carbon are optimally controlled to obtain both high input/output characteristics and high energy density. Specifically, when V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method:

(1) for high input/output characteristics, there is preferred activated carbon satisfying the inequalities $0.3 < V1 \leq 0.8$ and $0.5 \leq V2 \leq 1.0$, and having a surface area of between 1,500 m$^2$/g and 3,000 m$^2$/g, inclusive, as measured by the BET method (hereunder referred to as "activated carbon 1"), and (2) to obtain high energy density, there is preferred activated carbon satisfying the inequalities $0.8 < V1 \leq 2.5$ and $0.8 < V2 \leq 3.0$, and having a surface area of between 3,000 m$^2$/g and 4,000 m$^2$/g, inclusive, as measured by the BET method (hereunder referred to as "activated carbon 2").

The (1) activated carbon 1 and (2) activated carbon 2 will each be explained in order.

[Activated Carbon 1]

The mesopore volume V1 of activated carbon 1 is preferably a value larger than 0.3 cc/g, from the viewpoint of satisfactory input/output characteristics when the positive electrode material has been incorporated into a power storage element. On the other hand, it is also preferably no greater than 0.8 cc/g from the viewpoint of minimizing reduction of the bulk density of the positive electrode. The value of V1 is more preferably between 0.35 cc/g and 0.7 cc/g, inclusive and even more preferably between 0.4 cc/g and 0.6 cc/g, inclusive.

The micropore volume V2 of activated carbon 1 is preferably 0.5 cc/g or greater in order to increase surface area of the activated carbon and increase capacity. On the other hand, from the viewpoint of reducing the bulk of the activated carbon, so that the density of the electrode and the capacity per unit volume increase, it is also preferably no greater than 1.0 cc/g. The value of V2 is more preferably between 0.6 cc/g and 1.0 cc/g, inclusive and even more preferably between 0.8 cc/g and 1.0 cc/g, inclusive.

The ratio (V1/V2) of the mesopore volume V1 with respect to the micropore volume V2 is preferably in the range of $0.3 \leq V1/V2 \leq 0.9$. That is, V1/V2 is preferably 0.3 or greater from the viewpoint of increasing the ratio of the mesopore volume to the micropore volume to a degree allowing reduction in the output characteristics to be minimized while obtaining high capacity. On the other hand, V1/V2 is also preferably no greater than 0.9 from the viewpoint of increasing the ratio of the micropore volume to the mesopore volume to a degree allowing reduction in the capacity to be minimized while obtaining high output characteristics. A more preferred range for V1/V2 is $0.4 \leq V1/V2 \leq 0.7$, and an even more preferred range for V1/V2 is $0.55 \leq V1/V2 \leq 0.7$.

According to the invention, the micropore volume and mesopore volume are the values determined by the methods described below. Specifically, a sample is vacuum dried at 500° C. for a day and a night, and the adsorption/desorption isotherm is measured using nitrogen as the adsorbate. The isotherm at the desorption side is used for calculation of the micropore volume by the MP method and the mesopore volume by the BJH method.

The MP method is a method in which the "t-plot method" (B. C. Lippens, J. H. de Boer, J. Catalysis, 4319(1965)) is utilized to determine micropore volume, micropore area and micropore distribution, and it is the method proposed by M. Mikhail, Brunauer and Bodor (R. S. Mikhail, S. Brunauer, E. E. Bodor, J. Colloid Interface Sci., 26, 45 (1968)).

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

The mean pore size of the activated carbon 1 is preferably 17 angstrom or greater, more preferably 18 angstrom or greater and even more preferably 20 angstrom or greater, from the viewpoint of maximizing the output characteristics of the obtained power storage element. From the viewpoint of maximizing the capacity of the obtained power storage element, the mean pore size is preferably no greater than 25 angstrom. The "mean pore size", as used herein, is the value determined by dividing the total pore volume per mass of a sample, as obtained by measuring the equilibrium adsorption volumes of nitrogen gas under different relative pressures at the temperature of liquid nitrogen, by the BET specific surface area.

The BET specific surface area of the activated carbon 1 is preferably between 1,500 m$^2$/g and 3,000 m$^2$/g, inclusive, and more preferably between 1,500 m$^2$/g and 2,500 m$^2$/g, inclusive. If the BET specific surface area is 1,500 m$^2$/g or greater it will be easier to obtain high energy density, and if the BET specific surface area is 3,000 m²/g or lower there will be no need to add large amounts of a binder to maintain the strength of the electrode, and therefore the performance per volume of the electrode will tend to be higher.

The activated carbon 1 having such features can be obtained, for example, using the starting material and treatment method described below.

For this embodiment of the invention, the carbon source used as the starting material for the activated carbon 1 is not particularly restricted, and examples include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; and other synthetic wood or synthetic pulp materials, as well as carbides of the foregoing. From the viewpoint of suitability for mass-production and of cost, of these starting materials there are preferred plant-based starting materials such as coconut shell and wood dust, and their charcoal, and there are particularly preferred coconut shell charcoal.

The system used for carbonization and activation of these starting materials to obtain the activated carbon 1 may be a known system such as, for example, a fixed bed system, moving bed system, fluidized bed system, slurry system or rotary kiln system.

The carbonization method for these starting materials may be a method in which an inert gas such as nitrogen, carbon dioxide, helium, argon, xenon, neon, carbon monoxide or exhaust gas, or a mixed gas composed mainly of such inert gases with other gases, is used for firing at about 400 to 700° C. (preferably 450 to 600° C.) over a period of about 30 minutes to 10 hours.

The activation method for a carbonized material obtained by the carbonization method is preferably, for example, a gas activation method in which an activating gas such as water vapor, carbon dioxide or oxygen is used for firing. A method using water vapor or carbon dioxide as the activating gas is preferred.

In this activation method, preferably the activating gas is supplied at a rate of 0.5 to 3.0 kg/h (preferably 0.7 to 2.0 kg/h) while the carbonized material is raised to 800 to 1,000° C. over a period of 3 to 12 hours (preferably 5 to 11 hours and even more preferably 6 to 10 hours), for activation.

The carbonized material may be subjected to a primary activation before activation treatment of the carbonized material. In the primary activation, the carbon material may be fired at a temperature of below 900° C. using an activating gas such as water vapor, carbon dioxide or oxygen, for example, for gas activation.

By appropriate combinations for the firing temperature and firing time for the carbonization method, the activating gas supply rate, the temperature-elevating rate and maximum activation temperature in the activation method, it is possible to produce activated carbon 1 having the features described above, that may be used for this embodiment of the invention.

The mean particle size of the activated carbon 1 is preferably 1 to 20 µm. The term "mean particle size" as used herein refers to the particle diameter obtained upon determining a cumulative curve with the total volume at 100% with measurement of the particle size distribution using a particle size distribution analyzer, where the cumulative curve is 50% (that is, the 50% diameter (median diameter)). The mean particle size can be measured using a commercially available laser diffraction-type particle size distribution analyzer.

If the mean particle size is 1 µm or greater, the capacity per electrode volume will tend to be higher due to the higher density of the active material layer. A small mean particle size may lead to the disadvantage of low durability, but a mean particle size of at least 1 µm will help avoid this disadvantage. A mean particle size of no larger than 20 µm, on the other hand, will tend to be more suitable for high-speed charge-discharge. The mean particle size is more preferably 2 to 15 µm and even more preferably 3 to 10 µm.

[Activated Carbon 2]

The mesopore volume V1 of activated carbon 2 is preferably a value larger than 0.8 cc/g, from the viewpoint of a greater output characteristic when the positive electrode material has been incorporated into a power storage element. It is also preferably no greater than 2.5 cc/g from the viewpoint of minimizing reduction in the capacity of the power storage element. The value of V1 is more preferably between 1.00 cc/g and 2.0 cc/g, inclusive, and even more preferably between 1.2 cc/g and 1.8 cc/g, inclusive.

On the other hand, the micropore volume V2 of the activated carbon 2 is preferably a value larger than 0.8 cc/g, in order to increase the surface area of the activated carbon and increase the capacity. From the viewpoint of increasing the density of the activated carbon as an electrode and increasing the capacity per unit volume, it is also preferably no larger than 3.0 cc/g. The value of V2 is more preferably larger than 1.0 cc/g and no larger than 2.5 cc/g, and even more preferably between 1.5 cc/g and 2.5 cc/g, inclusive.

The micropore volume and mesopore volume of the activated carbon 2 can be measured by the method described above under (1) Activated carbon 1.

Activated carbon 2 having the mesopore volume and micropore volume described above has a greater BET specific surface area than activated carbon used in conventional electrical double layer capacitors or lithium ion capacitors. The specific value of the BET specific surface area of the activated carbon 2 is preferably between 3,000 m²/g and 4,000 m²/g, inclusive, and more preferably between 3,200 m²/g and 3,800 m²/g, inclusive. A BET specific surface area of 3,000 m²/g or greater will tend to result in satisfactory energy density. If the BET specific surface area is 40,00 m²/g or less, on the other hand, there will be no need to add large amounts of a binder to maintain the strength of the electrode, and therefore the performance per volume of the electrode will tend to be higher.

Activated carbon 2 having such features can be obtained, for example, using the starting materials and treatment method described below.

The carbonaceous material used as the starting material for the activated carbon 2 is not particularly restricted so long as it is a carbon source that can be used as an activated carbon starting material. Examples include plant-based starting materials such as wood, wood dust and coconut shell; fossil-based starting materials such as petroleum pitch and coke; and various synthetic resins such as phenol resin, furan resin, vinyl chloride resin, vinyl acetate resin, melamine resin, urea resin and resorcinol resin. Of these starting materials, phenol resin and furan resin are especially preferred, being suitable for fabrication of activated carbon with a high surface area.

The system used for carbonization and of these starting materials, and the heating method during activation treatment, may be a known system such as, for example, a fixed bed system, moving bed system, fluidized bed system, slurry system or rotary kiln system. Heating process is carried out under an inert gas atmosphere such as nitrogen, carbon dioxide, helium or argon, or a mixed gas composed mainly of such inert gases in admixture with other gases.

A common method employs a carbonization temperature of about 400 to 700° C. and a firing time of about 0.5 to 10 hours.

The activation method for the carbonized material after carbonization may be, for example, a gas activation method in which firing is accomplished using an activating gas such as water vapor, carbon dioxide or oxygen, or an alkali metal activation method in which heat treatment is carried out after mixture with an alkali metal compound. An alkali metal activation method is preferred for fabrication of activated carbon with a high surface area.

In this activation method, a carbonized material and an alkali metal compound such as KOH or NaOH are mixed so that the weight ratio of carbonized material:alkali metal compound is equal to or greater than 1:1 (the amount of the alkali metal compound being equal to or greater than the amount of the carbonized material), after which heat treatment is carried out in a range of 600 to 900° C. for 0.5 to 5 hours under an inert gas atmosphere, and then the alkali metal compound is subjected to cleaning removal with an acid and water, and drying is carried out.

In order to increase the micropore volume and not increase the mesopore volume, the amount of carbonized material may be increased, and mixed with KOH during activation. In order to increase both pore volumes, a larger amount of KOH may be used. In order to increase mainly the mesopore volume, steam-activation may be carried out after alkaline activation treatment.

The mean particle size of the activated carbon 2 is preferably between 1 µm and 30 µm, inclusive. The value is more preferably between 2 µm and 20 µm, inclusive. The activated carbon 1 and 2 may each be a single type of activated carbon, or a mixture of two or more different types of activated carbon, such that the mixture as a whole exhibits the characteristic values described above.

The positive electrode active material may include materials other than the activated carbons 1 and 2 (for example, activated carbon without the specified V1 and/or V2 values, or materials other than activated carbon (such as complex oxides of lithium and transition metals)). In the exemplary embodiment, the content of the activated carbon 1, or the content of the activated carbon 2, or the total content of the activated carbons 1 and 2, are preferably greater than 50 wt %, more preferably 70 wt % or greater, even more preferably 90 wt % or greater and most preferably 100 wt %, of the total positive electrode active material.

[Negative Electrode Active Material]

The negative electrode active material includes a carbon material that can occlude and release lithium ions. The negative electrode active material used may be the carbon material alone, or another material capable of occluding and releasing lithium ion may be used in addition to the carbon material. The other materials may be, for example, a lithium titanium complex oxide or a conductive polymer. In the exemplary embodiment, the content of carbon materials that can occlude and release lithium ion is preferably 50 wt % or greater and more preferably 70 wt % or greater, based on the total amount of the negative electrode active material. The value may be 100 wt %, but from the viewpoint of obtaining a satisfactory effect by combined used with other materials, it is preferably, for example. no greater than 90 wt %, and may even be 80 wt % or lower.

Examples of carbon materials that can occlude and release lithium ion include hard carbon, graphitizing carbon, and composite porous carbon materials.

More preferred examples of negative electrode active materials are the composite porous carbon materials 1 and 2 coated with a carbonaceous material on the surface of activated carbon, as described below (referred to respectively as "composite porous material 1" and "composite porous material 2"). These are advantageous in terms of negative electrode resistance. The negative electrode active material used may be of a single type or a mixture of two or more different types.

The composite porous materials 1 and 2 referred to above will be explained in order.

[Composite Porous Material 1]

For the present disclosure, the composite porous material 1 is a composite porous material specified by the following mesopore volume Vm1 and micropore volume Vm2.

The composite porous material 1 is a material that satisfies the inequalities $0.010 \leq Vm1 \leq 0.250$, $0.001 \leq Vm2 \leq 0.200$ and $1.5 \leq Vm1/Vm2 \leq 20.0$, where Vm1 (cc/g) is the mesopore volume due to pores with diameters of between 20 angstrom to 500 angstrom, inclusive, as calculated by the BJH method, and Vm2 (cc/g) is the micropore volume due to pores with diameters of smaller than 20 angstrom as calculated by the MP method.

The composite porous material can be obtained, for example, by combining activated carbon and a carbonaceous material precursor, and subjecting them in this state to heat treatment.

The activated carbon used as the starting material for composite porous material 1 is not particularly restricted so long as the obtained composite porous material exhibits the desired properties. For example, it is possible to use a commercially available product obtained from a petroleum-based, coal-based, plant-based or polymer-based starting material. It is particularly preferred to use activated carbon powder having a mean particle size of between 1 µm and 15 µm, inclusive. The mean particle size is more preferably between 2 µm and 10 µm, inclusive. The method of measuring the mean particle size is the same measuring method used for the mean particle size of the activated carbon as the positive electrode active material described above.

A carbonaceous material precursor to be used as a starting material for the composite porous material 1 is an organic material that can be coated as a carbonaceous material onto activated carbon by heat treatment. The carbonaceous material precursor may be a solid or liquid, or a substance that is soluble in a solvent. The carbonaceous material precursor may be, for example, pitch, mesocarbon microbeads, coke or a synthetic resin (for example, a phenol resin). Among such carbonaceous material precursors, the use of inexpensive pitch is preferred in terms of production cost. Pitch is largely classified as petroleum pitch or coal pitch. Examples of petroleum pitch include crude oil distillation residue, fluid catalytic cracking residue (such as decant oil), bottom oil from thermal crackers, and ethylene tar obtained during naphtha cracking.

When pitch is used, the composite porous material 1 is obtained by heat treatment of the pitch in the co-presence of activated carbon, causing thermal reaction of the volatile components and thermal decomposition components of the pitch on the surface of the activated carbon to coat the carbonaceous material onto the activated carbon. In this case, coating of the volatile components or thermal decomposition components of the pitch inside the pores of the activated carbon proceeds at a temperature of about 200 to 500° C., and the coated components undergo reaction to a carbonaceous material at 400° C. or higher. The peak temperature during heat treatment (maximum ultimate temperature) may be appropriately set depending on the properties of the composite porous material 1 to be obtained, the thermal reaction pattern and the thermal reaction atmosphere, but is preferably 400° C. or higher, more preferably 450° C. to 1,000° C. and even more preferably about 500 to 800° C. The time for which the peak temperature is maintained during heat treatment is preferably 30 minutes to 10 hours, preferably 1 hour to 7 hours and more preferably 2 hours to 5 hours. For example, with heat treatment at a peak temperature of about 500 to 800° C. over a period of 2 hours to 5 hours, the carbonaceous material adhering to the activated carbon surface is thought to be converted to polycyclic aromatic hydrocarbons.

The softening point of the pitch used as the carbonaceous material precursor is preferably between 30° C. and 250° C., inclusive, and more preferably between 60° C. and 130° C., inclusive. At 30° C. or higher, it will be possible to accomplish precise loading in without impairing the handleability. If the temperature is no higher than 250° C., the amount of low molecular compounds will be relatively high, and the carbonaceous material will be able to coat relatively fine pores in the activated carbon.

The method for producing the composite porous material 1 may be, for example, a method in which activated carbon is heat treated in an inert atmosphere containing a hydrocarbon gas volatilized from the carbonaceous material precursor, coating the activated carbon with the carbonaceous material in a gas phase. It may instead be a method in which the activated carbon and carbonaceous material precursor are pre-mixed and then heat treated, or the carbonaceous material precursor dissolved in a solvent is coated onto the activated carbon and dried, and then heat treated.

The composite porous material 1 has a carbonaceous material coated on the surface of activated carbon, and an important factor is the pore distribution after the carbonaceous material has been coated in the pores of the activated carbon. The pore distribution may be specified by the mesopore volume and the micropore volume. Particularly important for the purpose of the invention are the absolute values of the mesopore volume and the micropore volume, and the mesopore volume/micropore volume ratio. Specifically, for an embodiment of the invention, where $Vm1$ (cc/g) is the mesopore volume due to pores with diameters of between 20 angstrom and 500 angstrom, inclusive, as calculated by the BJH method, and $Vm2$ (cc/g) is the micropore volume due to pores with diameters of smaller than 20 angstrom as calculated by the MP method, for the composite porous material 1, preferably the inequalities $0.010 \leq Vm1 \leq 0.250$, $0.001 \leq Vm2 \leq 0.200$ and $1.5 \leq Vm1/Vm2 \leq 20.0$ are satisfied.

For the mesopore volume $Vm1$, more preferably $0.010 \leq Vm1 \leq 0.225$ and even more preferably $0.010 \leq Vm1 \leq 0.200$. For the micropore volume $Vm2$, more preferably $0.001 \leq Vm2 \leq 0.150$ and even more preferably $0.001 \leq Vm2 \leq 0.100$. For the mesopore volume/micropore volume ratio, more preferably $1.5 \leq Vm1/Vm2 \leq 15.0$ and even more preferably $1.5 \leq Vm1/Vm2 \leq 10.0$. If the mesopore volume $Vm1$ is equal to or less than the upper limit ($Vm1 \leq 0.250$) it will be possible to maintain high charge-discharge efficiency for lithium ions, and if the mesopore volume $Vm1$ and micropore volume $Vm2$ are at least the lower limit ($0.010 \leq Vm1$, $0.001 \leq Vm2$), high output characteristics will be obtained.

The ionic conductivity is higher in large-diameter mesopores than in micropores. The mesopore volume is therefore necessary to obtain high output characteristics. In small-diameter micropores, on the other hand, impurities such as moisture that can adversely affect the durability of the power storage element are difficult to desorb. In order to obtain high durability, therefore, it is thought necessary to control the micropore volume. Thus, control of the mesopore volume and micropore volume ratio is important. If the value is at least the lower limit ($1.5 \leq Vm1/Vm2$) (that is, when the carbonaceous material adheres more to the micropores than to the mesopores of the activated carbon, and the composite porous material after coating has a greater mesopore volume and a lesser micropore volume), high energy density, high output characteristics and high durability (cycle characteristics, float properties) can all be achieved. If the ratio of the mesopore volume and micropore volume is equal to or less than the upper limit ($Vm1/Vm2 \leq 20.0$), high output characteristics are obtained.

According to the invention, the method for measuring the mesopore volume $Vm1$ and the micropore volume $Vm2$ is the same as the measuring method for the positive electrode active material described above.

For an embodiment of the invention, the mesopore volume/micropore volume ratio after coating of the carbonaceous material on the surface of the activated carbon is important, as explained above. In order to obtain a composite porous material 1 having a pore distribution range as specified according to the invention, the pore distribution of the activated carbon used in the starting material is important.

In activated carbon used to form the composite porous material 1 as the negative electrode active material, if $V1$ (cc/g) is the mesopore volume due to pores with diameters of between 20 angstrom and 500 angstrom, inclusive, as calculated by the BJH method, and $V2$ (cc/g) is the micropore volume due to pores with diameters of smaller than 20 angstrom as calculated by the MP method, then preferably $0.050 \leq V1 \leq 0.500$, $0.005 \leq V2 \leq 1.000$ and $0.2 \leq V1/V2 \leq 20.0$.

For the mesopore volume $V1$, more preferably $0.050 \leq V1 \leq 0.350$ and even more preferably $0.100 \leq V1 \leq 0.300$. For the micropore volume $V2$, more preferably $0.005 \leq V2 \leq 0.850$ and even more preferably $0.100 \leq V2 \leq 0.800$. For the mesopore volume/micropore volume ratio, more preferably $0.22 \leq V1/V2 \leq 15.0$ and even more preferably $0.25 \leq V1/V2 \leq 10.0$. When the mesopore volume $V1$ of the activated carbon is 0.500 or smaller and the micropore volume $V2$ is 1.000 or smaller, coating a suitable amount of carbonaceous material will be sufficient for obtaining a pore structure for the composite porous material 1 according to this embodiment of the invention, and it will therefore tend to be easier to control the pore structure. For the same reason, if the mesopore volume $V1$ of the activated carbon is 0.050 or greater and the micropore volume $V2$ is 0.005 or greater, or even if the $V1/V2$ ratio is between 0.2 and 20.0, it will tend to be easy to obtain a porous structure for the composite porous material 1 from the pore distribution of the activated carbon.

The mean particle size of the composite porous material 1 of the invention is preferably between 1 μm and 10 μm, inclusive. The lower limit is more preferably 2 μm or greater and even more preferably 2.5 μm or greater. The upper limit is more preferably no greater than 6 μm and even more preferably no greater than 4 μm. If the mean particle size is between 1 μm and 10 μm, inclusive, then satisfactory durability will be maintained. The method of measuring the mean particle size of the composite porous material is the same measuring method used for the mean particle size of the activated carbon as the positive electrode active material described above.

For the composite porous material 1, the atomic ratio of hydrogen/carbon atom (hereunder also referred to as "H/C") is preferably between 0.05 and 0.35, inclusive, and more preferably between 0.05 and 0.15, inclusive. If H/C is 0.35 or smaller, the structure of the carbonaceous material adhering to the activated carbon surface (typically a polycyclic aromatic conjugated structure) will satisfactorily develop and the capacity (energy density) and charge-discharge efficiency will therefore increase, and is therefore preferred. If H/C is 0.05 or larger, on the other hand, there will be no excessive carbonization, and therefore satisfactory energy density will be obtained. The H/C ratio is measured with an elemental analyzer.

The composite porous material 1 has an amorphous structure derived from the activated carbon of the starting material, and preferably has a crystal structure derived mainly from the coated carbonaceous material. A low-crystalline structure is preferred in order to exhibit high output characteristics, while a high-crystalline structure is preferred to maintain reversibility of charge-discharge. From this viewpoint, in the composite porous material 1, preferably the plane spacing $d_{002}$ of the (002) plane, measured by wide-angle X-ray diffraction, is between 3.60 angstrom and 4.00 angstrom, inclusive, and the crystallite size Lc in the c-axis direction obtained from the half width of the peak is between 8.0 angstrom and 20.0 angstrom, inclusive, and more preferably $d_{002}$ is between 3.60 angstrom and 3.75 angstrom, inclusive, and the crystallite size Lc in the c-axis direction obtained from the half width of the peak is between 11.0 angstrom and 16.0 angstrom, inclusive.

[Composite Porous Material 2]

For the present disclosure, the composite porous material 2 is a composite porous material having a carbonaceous material coated on the surface of activated carbon, the weight ratio of the carbonaceous material with respect to the activated carbon being between 10% and 60%, inclusive. The mass ratio is preferably between 15% and 55%, inclusive, more preferably between 18% and 50%, inclusive and most preferably between 20% and 47%, inclusive. If the weight ratio of the carbonaceous material is 10% or greater, it will be possible to suitably fill the micropores of the activated carbon with the carbonaceous material, and the durability will not be impaired due to the increased charge-discharge efficiency of lithium ions. If the weight ratio of the carbonaceous material is 60% or smaller, the surface area can be increased by appropriately maintaining the pores of the composite porous material. The lithium ion pre-doping amount can therefore be increased, and as a result, high power density and high durability can be maintained even if the negative electrode is a thin-film.

The surface area of the composite porous material 2 by the BET method is preferably 350 m²/g to 1,500 m²/g and more preferably 400 m²/g to 1,100 m²/g. If the surface area is 350 m²/g or greater, the composite porous material 2 will appropriately maintain its pores. The lithium ion pre-doping amount can therefore be increased, and as a result, the negative electrode can be made into a thin-film. If the surface area is 1,500 m²/g or smaller, on the other hand, the micropores of the activated carbon will be suitably filled.

The lithium ion will therefore have improved charge-discharge efficiency, as a result, the durability will not be impaired.

The composite porous material 2 can be obtained, for example, by heat treating the activated carbon and carbonaceous material precursor in a combined state. Specific examples and the heat treatment method for the activated carbon and carbonaceous material precursor for production of composite porous material 2 are the same as for composite porous material 1, and will not be repeated here.

The softening point of the pitch used for composite porous material 2, however, is preferably between 30° C. and 100° C., inclusive, and more preferably between 35° C. and 85° C., inclusive. At 30° C. or higher, it will be possible to accomplish precise loading without impairing the handleability. If the softening point is 100° C. or lower, the amount of low molecular compounds will be relatively high, and therefore the carbonaceous material will be able to coat the fine pores in the activated carbon.

The composite porous material 2 has a carbonaceous material coated on the surface of activated carbon. An important factor is the pore distribution after the carbonaceous material has been coated in the pores of the activated carbon. The pore distribution may be specified by the mesopore volume and the micropore volume. Specifically, composite porous material 2 preferably satisfies any one of the following 3 ranges, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

(1) $0.010 \leq Vm1 \leq 0.300$ and $0.010 \leq Vm2 \leq 0.200$
(2) $0.010 \leq Vm1 \leq 0.200$ and $0.200 \leq Vm2 \leq 0.400$
(3) $0.010 \leq Vm1 \leq 0.100$ and $0.400 \leq Vm2 \leq 0.650$ For (1) above, more preferably $0.050 \leq Vm1 \leq 0.300$ and $0.010 \leq Vm2 \leq 0.200$.

If the mesopore volume Vm1 is equal to or less than the upper limit (Vm1≤0.300), the surface area of the composite porous material 2 can be greater and the lithium ion pre-doping amount can be increased. In addition, the bulk density of the negative electrode can be increased, allowing the negative electrode to be formed as a thin-film. If the micropore volume Vm2 is equal to or less than the upper limit (Vm1≤0.650), high charge-discharge efficiency can be maintained for lithium ions. If the mesopore volume Vm1 and micropore volume Vm2 are each at least the lower limit (0.010≤Vm1, 0.010≤Vm2), high output characteristics can be obtained.

According to the invention, the method for measuring the mesopore volume Vm1 and the micropore volume Vm2 is the same as the measuring method for the positive electrode active material described above.

The mean particle size of the composite porous material 2 of the invention is preferably between 1 μm and 10 μm, inclusive. The lower limit is more preferably 2 μm or more, and even more preferably 2.5 μm or more. The upper limit is more preferably no greater than 6 μm and even more preferably no greater than 4 μm. If the mean particle size is between 1 μm and 10 μm, inclusive, then satisfactory durability will be maintained. The method of measuring the mean particle size of the composite porous material referred to here is the same method used for the activated carbon used in the positive electrode active material described above.

For composite porous material 2, the mean pore size is preferably 28 angstrom or greater and more preferably 30 angstrom or greater, from the viewpoint of high output characteristics. From the viewpoint of high energy density, it is preferably no greater than 65 angstrom and more preferably no greater than 60 angstrom. The "mean pore size", for the purpose of the invention, means the value determined by dividing the total pore volume per mass, as obtained by measuring the equilibrium adsorption volumes of nitrogen gas under different relative pressures at the temperature of liquid nitrogen, by the BET specific surface area.

For composite porous material 2, the atomic ratio of hydrogen/carbon atom (H/C) is preferably between 0.05 and 0.35, inclusive, and more preferably between 0.05 and 0.15, inclusive. If H/C is 0.35 or smaller, the carbonaceous material adhering to the activated carbon surface (typically a polycyclic aromatic conjugated structure) will satisfactorily develop and the capacity (energy density) and charge-discharge efficiency will increase. If H/C is 0.05 or larger, on the other hand, there will be no excessive carbonization, and therefore satisfactory energy density will be obtained. The H/C ratio is measured with an elemental analyzer.

The thickness of the negative electrode active material layer, when using composite porous material 2, is preferably between 20 μm and 45 μm, inclusive, and more preferably 20 to 40 μm, inclusive, and even more preferably 25 to 35 μm, inclusive, per side, from the viewpoint of resistance of the negative electrode.

The composite porous material 2 has an amorphous structure derived from the activated carbon of the starting material, but simultaneously also has a crystal structure derived mainly from the coated carbonaceous material. In the composite porous material 2, preferably the plane spacing $d_{002}$ of the (002) plane, measured by wide-angle X-ray diffraction, is between 3.60 angstrom and 4.00 angstrom, inclusive, and the crystallite size Lc in the c-axis direction obtained from the half-power band width of the peak is between 8.0 angstrom and 20.0 angstrom, inclusive, and more preferably $d_{002}$ is between 3.60 angstrom and 3.75 angstrom, inclusive, and the crystallite size Lc in the c-axis direction obtained from the half width of the peak is between 11.0 angstrom and 16.0 angstrom, inclusive.

The negative electrode active material layer of the invention will be described.

[Negative Electrode Active Material Layer]

The negative electrode active material layer of the invention includes at least one sulfur compound selected from the group consisting of sulfonic acid derivatives represented by each of the following formulas (1) and (2), and sulfurous acid derivatives represented by each of the following formulas (3) and (4), the total amount of the sulfonic acid derivatives and sulfurous acid derivatives being $2.6 \times 10^{-6}$ mol/g to $2,000 \times 10^{-6}$ mol/g per unit weight of the negative electrode active material.

[Chemical Formula 17]

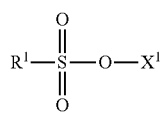

(1)

{In formula (1), $R^1$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^1$ represents hydrogen, lithium or a C1-12 alkyl group.}

[Chemical Formula 18]

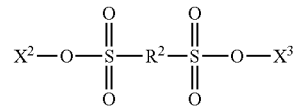

(2)

{In formula (2), $R^2$ represents a C1-24 alkyl group, a C1-24 mono or polyhydroxyalkyl group or its lithium alkoxide, a C2-24 alkenyl group, a C2-24 mono or polyhydroxyalkenyl group, a C3-6 cycloalkyl group, or an aryl group, and $X^2$ and $X^3$ each independently represent hydrogen, lithium or a C1-12 alkyl group.}

[Chemical Formula 19]

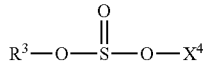

(3)

{In formula (3), $R^3$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^4$ represents hydrogen, lithium or a C1-12 alkyl group.}

[Chemical Formula 20]

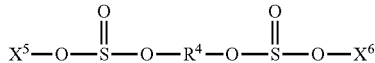

(4)

{In formula (4), $R^4$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^5$ and $X^6$ each independently represent hydrogen, lithium or a C1-12 alkyl group.}

The sulfonic acid derivatives represented by each of formulas (1) and (2) will be described first.

Examples of sulfonic acid derivatives represented by formula (1) include:

alkylsulfonic acids such as methanesulfonic acid, ethanesulfonic acid, 1-propanesulfonic acid, 2-propanesulfonic acid, 1-butanesulfonic acid, 2-butanesulfonic acid, 3-butanesulfonic acid, 2-methyl-2-propanesulfonic acid, 1-pentanesulfonic acid, 1-hexanesulfonic acid, 1-heptanesulfonic acid and 1-octanesulfonic acid, and monohydroxyalkylsulfonic acids such as hydroxymethanesulfonic acid, 2-hydroxyethanesulfonic acid, 3-hydroxypropanesulfonic acid, 4-hydroxybutanesulfonic acid, 5-hydroxypentanesulfonic acid, 6-hydroxyhexanesulfonic acid, 7-hydroxyheptanesulfonic acid and 8-hydroxyoctylsulfonic acid;

dihydroxyalkylsulfonic acids such as 2,3-dihydroxypropanesulfonic acid, 3,4-dihydroxybutanesulfonic acid, 2,4-dihydroxybutanesulfonic acid, 4,5-dihydroxypentanesulfonic acid, 3,5-dihydroxypentanesulfonic acid, 2,5-dihydroxypentanesulfonic acid, 5,6- dihydroxyhexanesulfonic acid, 4,6-dihydroxyhexanesulfonic acid, 3,6-dihydroxyhexanesulfonic acid and 2,6-dihydroxyhexanesulfonic acid;

alkenesulfonic acids such as ethylenesulfonic acid, 1-propenesulfonic acid, 1-butenesulfonic acid, 1-pentenesulfonic acid, 1-hexenesulfonic acid, 1-heptenesulfonic acid and 1-octenesulfonic acid, and monohydroxyalkenylsulfonic acids such as 3-hydroxy-1-propenesulfonic acid, 3-hydroxy-2-propenesulfonic acid, 4-hydroxy-2-butenesulfonic acid, 4-hydroxy-1-butenesulfonic acid, 5-hydroxy-3-heptenesulfonic acid, 5-hydroxy-2-heptenesulfonic acid, 5-hydroxy-1-heptenesulfonic acid, 6-hydroxy-4-hexenesulfonic acid, 6-hydroxy-3-hexenesulfonic acid, 6-hydroxy-2-hexenesulfonic acid and 6-hydroxy-1-hexenesulfonic acid;

cycloalkylsulfonic acids such as cyclopropylsulfonic acid, cyclobutylsulfonic acid, cyclopentylsulfonic acid and cyclohexylsulfonic acid; and benzenesulfonic acids (C6-C8 arylsulfonic acids) such as benzenesulfonic acid, 2-methylbenzenesulfonic acid, 3-methylbenzenesulfonic acid, 4-methylbenzenesulfonic acid, 2,4-dimethylbenzenesulfonic acid, 2,5-dimethylbenzenesulfonic acid, 2-ethylbenzenesulfonic acid, 3-ethylbenzenesulfonic acid and 4-ethylbenzenesulfonic acid.

Examples of sulfonic acid derivatives represented by formula (2) include disulfonic acids such as methanedisulfonic acid, 1,2-ethanedisulfonic acid, 1,3-propanedisulfonic acid, 1,4-butanedisulfonic acid, 1,5-pentanedisulfonic acid, 1,6-hexanedisulfonic acid, 1,7-heptanedisulfonic acid, 1,8-octanedisulfonic acid, 1,9-nonanedisulfonic acid, 1,10-decanedisulfonic acid, 1,12-dodecanedisulfonic acid and 4,4'-biphenyldisulfonic acid. Sulfonic acid derivatives represented by each of formulas (1) and (2) may be structural isomers of the sulfonic acids or disulfonic acids; lithium salts of the sulfonic acids or disulfonic acids; or alkyl sulfonate esters such as methyl esters, ethyl esters or propyl esters of the sulfonic acids or disulfonic acids.

Of these, from the viewpoint of electrochemical stability, there are preferred:

compounds where in formula (1), $R^1$ is a C1-24 alkyl group, C2-24 alkenyl group, C3-6 cycloalkyl group or aryl group, and $X^1$ is hydrogen, lithium or a C1-12 alkyl group, and compounds where in formula (2), $R^2$ is a C1-24 alkyl group, C2-24 alkenyl group, C3-6 cycloalkyl group or aryl group, and $X^2$ and $X^3$ each independently represent hydrogen, lithium or a C1-12 alkyl group. More preferred among the compounds represented by formula (1) are compounds wherein $R^1$ represents a C3-4 alkyl group, C3-4 mono or polyhydroxyalkyl group or its lithium alkoxide, a C3-4 alkenyl group or C3-4 mono or polyhydroxyalkenyl group or its lithium alkoxide, and $X^1$ represents hydrogen, lithium or a C1-2 alkyl group.

Especially preferred compounds are (di)sulfonic acid derivatives selected from among:

compounds represented by $C_3H_7SO_3X^1$ and $C_3H_5SO_3X^1$ {wherein $X^1$ is hydrogen, lithium or a C1-2 alkyl group}, and compounds represented by $X^2O_3SC_6H_{12}SO_3X^3$ and $X^2O_3SC_6H_8SO_3X^3$ {wherein $X^2$ and $X^3$ each independently represent hydrogen, lithium or a C1-2 alkyl group}.

The sulfurous acid derivatives represented by each of formulas (3) and (4) will be described.

Examples of sulfurous acid derivatives represented by formula (3) include lithium methyl sulfite, lithium ethyl sulfite, lithium vinyl sulfite, lithium propyl sulfite and lithium butyl sulfite, and examples of sulfurous acid derivatives represented by formula (4) include dilithium methane disulfite, dilithium 1,2-ethane disulfite, dilithium 1,3-propane disulfite and dilithium 1,4-butane disulfite.

Examples of methods for adding these sulfur compounds to the negative electrode active material layer according to the invention include:

a method of mixing the sulfur compound with the negative electrode active material layer, a method of adsorbing the sulfur compound onto the negative electrode active material, and a method of electrochemically depositing the sulfur compound onto the negative electrode active material.

Preferred among these is a method of adding a precursor that can dissolve in the non-aqueous electrolyte to produce such a sulfur compound, as an additive, and utilizing decomposition reaction of the precursor in the step of fabricating the power storage element, to accumulate the sulfur compound in the negative electrode active material layer.

The precursor that is to form a sulfonic acid derivative is preferably a sultone compound represented by each of formulas (9) to (11).

Among these, from the viewpoint of ease of reductive decomposition on the negative electrode active material and electrochemical stability of formed sulfur compound, it is preferred to use as precursors to form sulfonic acid derivatives, one or more different compounds selected from the group consisting of 1,3-propane sultone, 2,4-butane sultone, 1,4-butane sultone, 1,3-butane sultone, 2,4-pentane sultone, 1,3-propene sultone and 1,4-butene sultone, with 1,3-propane sultone being more preferred.

As precursors to form sulfurous acid derivatives it is preferred to use one or more compounds selected from among sulfites such as ethylene sulfite, vinylene sulfite, propylene sulfite, butylene sulfite, dimethyl sulfite and diethyl sulfite.

The total amount of the sulfur compounds is $2.6 \times 10^{-6}$ mol/g or greater, preferably $3.0 \times 10^{-6}$ mol/g or greater and most preferably $15.7 \times 10^{-6}$ mol/g or greater, per unit weight of the negative electrode active material. If the total amount of sulfur compounds is $2.6 \times 10^{-6}$ mol/g or greater per unit weight of the negative electrode active material, the non-aqueous electrolyte will not come into contact with the negative electrode active material, and reductive decomposition of the non-aqueous electrolyte can be minimized.

The total amount of sulfur compounds is no greater than $2,000 \times 10^{-6}$ mol/g, preferably no greater than $870 \times 10^{-6}$ mol/g, even more preferably no greater than $800 \times 10^{-6}$ mol/g and most preferably no greater than $770 \times 10^{-6}$ mol/g, per unit weight of the negative electrode active material. If the total amount of sulfur compounds is no greater than $2,000 \times 10^{-6}$ mol/g per unit weight of the negative electrode active material, diffusion of Li ion will not be inhibited and high input/output characteristics can be exhibited.

The negative electrode active material layer of the invention preferably contains at least one compound selected from among:

{wherein $X^7$ represents —(COO)$_n$Li (where n is 0 or 1)}, and

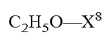

{wherein $X^8$ represents —(COO)$_n$Li (where n is 0 or 1), at $7.8 \times 10^{-4}$ mol/g or less per unit weight of the negative electrode active material.

The functions of these compounds is not fully understood. However, because these compounds have low electrochemical stability, it is conjectured that decomposition reaction of the compounds proceeds in a high-temperature environment, generating gas. The amounts of such compounds in the negative electrode active material are therefore preferably low. If the contents are no greater than $7.8 \times 10^{-4}$ mol/g per unit weight of the negative electrode active material, it will be possible to minimize the gas quantity generated upon their decomposition. The contents are more preferably no greater than $3.0 \times 10^{-4}$ mol/g and even more preferably no greater than $2.5 \times 10^{-4}$ mol/g.

The negative electrode active material of the invention is preferably pre-doped with lithium ion. According to a particularly preferred embodiment, the composite porous material 2 in the negative electrode active material layer is pre-doped with lithium ion. The pre-doping amount is preferably between 1,050 mAh/g and 2,050 mAh/g, inclusive, more preferably between 1,100 mAh/g and 2,000 mAh/g, inclusive, even more preferably between 1,200 mAh/g and 1,700 mAh/g, inclusive and even more preferably between 1,300 mAh/g and 1,600 mAh/g, inclusive, per unit weight of the composite porous material 2.

Pre-doping lithium ion will lower the negative electrode potential, increasing the cell voltage when combined with the positive electrode and also increasing the utilizable capacity of the positive electrode. The capacity and energy density will therefore be increased. If the pre-doping amount is an amount exceeding 1,050 mAh/g, lithium ion will be satisfactory pre-doped even at irreversible sites of the negative electrode material where lithium ion cannot be desorbed after once being inserted, and it will also be possible to reduce the amount of negative electrode active material per amount of lithium. The negative electrode film thickness can therefore be reduced, and high durability, satisfactory output characteristics and high energy density can be obtained. With increasing pre-doping amount, the negative electrode potential decreases, and the durability and energy density increase. If the pre-doping amount is no greater than 2,050 mAh/g, there will be no risk of side-effects such as deposition of lithium metal.

The method used for pre-doping the negative electrode with lithium ion may be a known method. One example is a method of molding the negative electrode active material into an electrode body, and then using the negative electrode body as the working electrode and metal lithium as the counter electrode to fabricate an electrochemical cell in combination with a non-aqueous electrolyte, and electrochemically pre-doping the negative electrode with lithium ion. It is also possible to contact bond a metal lithium foil onto the negative electrode body and place the body in a non-aqueous electrolyte, for pre-doping of the negative electrode with lithium ion.

By doping the negative electrode active material with lithium ion it is possible to satisfactorily control the power storage element capacity and operating voltage.

[Common Elements of Positive Electrode and Negative Electrode]

The features common to the positive electrode and negative electrode are (1) the components other than the active material of the active material layer, (2) the current collector, and (3) the construction of the electrode body, and these will be explained in order.

(1) Components Other Than Active Material of Active Material Layer

The active material layers of the positive electrode and the negative electrode each further contain known components that are included in active material layers in lithium ion batteries and capacitors, in addition to their active materials. Examples of such known components include binders, conductive fillers and thickening agents, which are not restricted in their types.

Components other than active materials, to be included in the active material layers of the positive electrode and negative electrode of the non-aqueous lithium-type power storage element of this embodiment, will now be explained in detail.

The active material layer may include a conductive filler (for example, carbon black) and a binder, as necessary.

The amount of conductive filler used is preferably 0 to 30 parts by weight and more preferably 1 to 20 parts by weight with respect to 100 parts by weight of the active material. From the viewpoint of high power density, it is preferred to use a conductive filler. The amount used is preferably no greater than 30 parts by weight, as the ratio of the active material in the active material layer will be higher and the power density per active material layer volume will tend to be greater.

For the active material layer there is used a binder to anchor the aforementioned active material, and if necessary a conductive filler onto the current collector as the active material layer. Examples of binders include polyvinylidene fluoride (PVdF), polytetrafluoroethylene (PTFE), fluorine rubber, styrene-butadiene copolymer and cellulose derivatives. The amount of binder is preferably in the range of 3 to 20 parts by weight and more preferably in the range of 5 to 15 parts by weight with respect to 100 parts by weight of the active material. If the amount of binder is no greater than 20 parts by weight, the binder will not cover the surface of the active material. This is preferred as ion access into the active material layer will therefore be more rapid, and high power density will be more easily obtained. The amount of binder is also preferably at least 3 parts by weight, as the active material layer will be more easily anchored onto the current collector.

(2) Collector

The collector may be a common collector used for power storage elements. The collector is preferably a metal foil that does not undergo deterioration by elution into the electrolyte or reaction with the electrolyte. There are no particular restrictions on such metal foils, and examples include copper foils and aluminum foils. In the power storage element of the invention, preferably the positive current collector is an aluminum foil and the negative current collector is a copper foil.

The collector may be a metal foil without holes, or a metal foil having through-holes (for example, punching metal through-holes) or open hole sections (for example, expanded metal open hole sections).

The thickness of the current collector is not particularly restricted but is preferably 1 to 100 μm. The thickness of the current collector is preferably 1 μm or greater, to allow retention of the shape and strength of the electrode bodies having the active material layers anchored to the current collector (the positive electrode and negative electrode of the invention). The thickness of the current collector is also preferably no greater than 100 μm, as the mass and volume will be suitable as a power storage element, and the performance per mass and volume will tend to be high.

(3) Construction of Electrode Body

The electrode body comprises an active material layer on one or both sides of a collector. According to a typical embodiment, the active material layer is anchored to the current collector.

The electrode body can be produced by a known electrode production technique for lithium ion batteries or electrical double layer capacitors. For example, various materials including active materials may be prepared as a slurry with water or an organic solvent, and the slurry coated onto the current collector and dried, with pressing at room temperature or under heating as necessary, to form an active material layer. Various materials including active materials may also be dry-mixed without using a solvent, and the obtained mixture press-molded and then attached to a collector using a conductive adhesive.

The thickness of the positive electrode active material layer is preferably between 15 μm and 100 μm, inclusive, and more preferably between 20 μm and 85 μm, inclusive, per side. If the thickness is 15 μm or greater, sufficient energy density as a capacitor can be exhibited. If the thickness is 100 μm or smaller, on the other hand, high input/output characteristics as a capacitor can be obtained.

The thickness of the negative electrode active material layer is preferably between 20 μm and 45 μm, inclusive, and more preferably between 25 μm and 40 μm, inclusive, per side. If the thickness is 20 μm or greater, satisfactory charge-discharge capacity can be exhibited. If the thickness is 45 μm or smaller, on the other hand, the energy density can be increased by reducing the cell volume.

When the current collector has holes as described below, the thickness of the active material layers of the positive electrode and negative electrode are the average values of the respective thicknesses per side at the sections of the current collectors without holes.

The bulk density of the negative electrode active material layer is preferably between 0.60 $g/cm^3$ and 1.2 $g/cm^3$, inclusive, and more preferably between 0.70 $g/cm^3$ and 1.0 $g/cm^3$, inclusive. If the bulk density is 0.60 $g/cm^3$ or greater, satisfactory strength can be obtained and satisfactory conductivity can be exhibited between the active materials. If the bulk density is 1.2 $g/cm^3$ or lower, it is possible to ensure pores through which the ions can be satisfactorily diffused in the active material layer.

[Separator]

The positive electrode body and negative electrode body formed in this manner are laminated or rotary laminated via a separator, and an electrode laminate body with the positive electrode body, negative electrode body and separator is formed.

The separator used may be a polyethylene microporous film or polypropylene microporous film used in lithium ion secondary batteries, or a cellulose nonwoven sheet used in electrical double layer capacitors.

The thickness of the separator is preferably between 10 μm and 50 μm, inclusive. The thickness is preferably 10 μm or greater, as this will tend to reduce self-discharge due to internal microshorts. The thickness is also preferably no greater than 50 μm, as this will tend to result in higher output characteristics of the power storage element.

[External Body]

The external body used may be a metal can or laminate film.

The metal can is preferably made of aluminum.

The laminate film is preferably a laminated film of a metal foil and a resin film, an example of which is a three-layer structure comprising the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolyte housed inside while also providing a melt seal during heat sealing of the external body, and a polyolefin or acid-modified polyolefin may be suitably used.

[Non-Aqueous Lithium-Type Power Storage Element]

The non-aqueous lithium-type power storage element of this embodiment has a construction with an electrode laminate body obtained as described above, and the non-aqueous electrolyte, housed in the external body.

The non-aqueous lithium-type power storage element of this embodiment exhibits both high input/output characteristics and high durability at high temperature, as will be concretely verified in the examples described below.

EXAMPLES

The invention will be explained in detail through examples and comparative examples, with the understanding that these examples are not limitative on the invention.

Example 1

[Fabrication of Positive Electrode Body]

Crushed coconut shell charcoal was subjected to carbonization in a small carbonizing furnace, at 500° C. for 3 hours under nitrogen gas atmosphere. The carbonized material obtained by the treatment was placed in an activating furnace and water vapor was loaded into the activating furnace at 1 kg/h, in a heated state created by a preheating furnace, the temperature was raised to 900° C. over a period of 8 hours, after which the product was removed and cooled under a nitrogen atmosphere to obtain activated carbon. The obtained activated carbon was flow-rinsed for 10 hours and then drained. After then drying for 10 hours in an electro-desiccator held at 115° C., it was pulverized for 1 hour with a ball mill to obtain activated carbon 1. A laser diffraction particle size distribution analyzer (SALD-2000J) by Shimadzu Corp. was used to measure the mean particle size of the activated carbon 1, which was found to be 4.2 μm. Also, a pore distribution measuring apparatus (AUTOSORB-1 AS-1-MP) by Yuasa-Ionics, Inc. was used to measure the pore distribution of the activated carbon 1. As a result, the BET specific surface area was 2,360 $m^2/g$, the mesopore volume (V1) was 0.52 cc/g and the micropore volume (V2) was 0.88 cc/g.

A slurry was obtained by mixing 80.8 parts by weight of activated carbon 1, 6.2 parts by weight of Ketchen black, 10 parts by weight of PVDF (polyvinylidene fluoride), 3.0 parts by weight of PVP (polyvinylpyrrolidone) and NMP (N-methylpyrrolidone). The obtained slurry was coated onto one or both sides of a collector made of aluminum foil with a thickness of 15 μm, and dried and pressed, to obtain a positive electrode body with a positive electrode active material layer thickness of 55 μm per side.

[Fabrication of Negative Electrode Body]

For Example 1 there were used:

commercially available coconut shell activated carbon as activated carbon, and coal pitch (softening point: 50° C.) as a carbonaceous material precursor.

The pore distribution and specific surface area of the commercially available coconut shell activated carbon were measured by the following methods.

The pore distribution was measured using a pore distribution measuring apparatus (AUTOSORB-1 AS-1-MP) by Yuasa-Ionics, Inc., with nitrogen as the adsorbate. As explained above, the isotherm at the desorption side was used for calculation of the mesopore volume by the BJH method and the micropore volume by the MP method. The specific surface area was measured by the single point BET method. As a result, the BET specific surface area was 1,780 m²/g, the mesopore volume was 0.198 cc/g, the micropore volume was 0.695 cc/g, V1/V2=0.29, and the mean pore size was 21.2 angstrom.

A 150 g portion of the coconut shell activated carbon was placed into a stainless steel mesh basket and placed on a stainless steel vat containing 270 g of coal pitch (softening point: 50° C.), and set in an electric furnace (furnace inner usable dimension: 300 mm×300 mm×300 mm), for thermal reaction to obtain composite porous material 1. The heat treatment was temperature increase to 600° C. over a period of 8 hours under a nitrogen atmosphere, and 4 hours of holding at the same temperature. It was then allowed to naturally cool to 60° C., after which the composite porous material 1 as the negative electrode material was removed out of the furnace.

When the obtained composite porous material 1 was measured in the same manner as described above, the BET specific surface area was 262 m²/g, the mesopore volume (Vm1) was 0.1798 cc/g, the micropore volume (Vm2) was 0.0843 cc/g and Vm1/Vm2=2.13.

The obtained composite porous material 1 was then used as a negative electrode active material to produce a negative electrode.

A slurry was obtained by mixing 83.4 parts by weight of the composite porous material 1, 8.3 parts by weight of acetylene black, 8.3 parts by weight of PVDF (polyvinylidene fluoride) and NMP (N-methylpyrrolidone). The obtained slurry was coated onto both sides of an expanded copper foil, and then dried and pressed to obtain a negative electrode body with a negative electrode active material layer having a single-side thickness of 60 μm. On one side of the double-sided negative electrode body there was attached a lithium metal foil in an amount corresponding to 760 mAh/g per unit weight of the composite porous material 1.

[Preparation of Electrolyte]

As a non-aqueous electrolyte there was used a solution obtained by dissolving, in a mixed solvent comprising ethylene carbonate (EC):methyl ethyl carbonate (MEC) in a volume ratio of 1:2, $LiPF_6$ in an amount for a concentration of 1 mol/l and, as an additive, 1,3-propane sultone (1,3-PS) in an amount for 0.3 wt %, with respect to the total electrolyte.

[Assembly and Performance of Power Storage Element]

Each obtained electrode body was cut to 100 mm×100 mm, a single-side coated positive electrode body was used on the uppermost side and lowermost side, 18 double-side coated negative electrode bodies and 17 double-sided positive electrode bodies were used as intermediate layers, and cellulose nonwoven fabric separators (total of 36) were stacked between the negative electrode body and the positive electrode body, and then an electrode terminal was connected each of the negative electrode body and the positive electrode body to form an electrode laminate body. The laminate body was inserted into an external body comprising a laminate film, the non-aqueous electrolyte was injected and the external body was sealed to assemble a non-aqueous lithium-type power storage element.

<Analysis of Electrolyte>

Of the completed non-aqueous lithium-type power storage elements, several elements were adjusted to 2.9 V, and then disassembled in an Ar box set in a room at 23° C. and controlled to the dew point up to −90° C. and an oxygen concentration of no greater than 1 ppm, and the electrolyte was removed. The removed electrolyte was placed in a 3 mmϕ NMR tube (PN-002 by Shigemi Corp.) and inserted into a 5 mmϕ NMR tube (N-5 by Nihon Seimitsu Kagaku Co., Ltd.) containing 1,2,4,5-tetrafluorobenzene-added deuterated chloroform, and $^1$H-NMR measurement and $^{19}$F-NMR measurement were carried out by the double tube method. For 1,2,4,5-tetrafluorobenzene, the 7.1 ppm (2H) signal in $^1$H NMR was normalized as an integral of 2 and the −141.3 ppm (4F) signal in $^{19}$F NMR was normalized as an integral of 4, and the electrolyte composition was determined from the integral ratio for each compound observed. Based on this method, the electrolyte in the non-aqueous lithium-type power storage element contained $LiPF_6$ at a concentration of 1 mol/l in the electrolyte, and 1,3-propane sultone (1,3-PS) at 0.25 wt %, and the linear carbonates such as MEC were calculated to be present at 66 vol % with respect to the electrolyte excluding Li salts.

<Analysis of Negative Electrode Active Material Layer>

Of the completed non-aqueous lithium-type power storage elements, several elements were adjusted to 2.9 V, and then disassembled in an Ar box set in a room at 23° C. and controlled to the dew point up to −90° C. and an oxygen concentration of no greater than 1 ppm, and the negative electrode body was removed. The removed negative electrode body was dipped and washed in dimethyl carbonate (DMC), and then vacuum dried in a side box while maintaining a state without exposure to air.

The dried negative electrode body was transferred from the side box to an Ar box while maintaining a state without exposure to air, and was dipped and extracted in heavy water to obtain a negative electrode body liquid extract. The liquid extract was analyzed by (1) IC/MS and (2) $^1$H-NMR, and the abundance per unit weight of the negative electrode active material (mol/g) for each compound accumulated on the negative electrode body was determined by the following formula 1:

Abundances per unit weight (mol/g)=$A \times B \div C$     (Formula 1)

where A (mol/ml) is the concentration of each compound in the negative electrode body liquid extract, B (ml) is the volume of heavy water used for extraction and C (g) is the mass of active material of the negative electrode used for extraction.

The active material mass in the negative electrode used for extraction was determined by the following method.

The mixture (negative electrode active material layer) was peeled off from the current collector of the negative electrode body remaining after heavy water extraction, and the peeled mixture was rinsed with water and vacuum dried. The mixture obtained by vacuum drying was rinsed with NMP or DMF to remove the binder (PVDF) from the mixture. It was again vacuum dried to remove the rinsing solvent, and water was added to the obtained mixture, after which centrifugal separation was carried out to separate the negative electrode active material and the filler. The obtained negative electrode active material was again vacuum dried, and weighed to determine the active material mass of the negative electrode used for extraction.

The method of analyzing the liquid extract was as follows.

(1) IC/MS measurement (negative mode) of the negative electrode body liquid extract detected mainly $CH_3CH_2CH_2SO_3^-$ and $HOCH_2CH_2CH_2SO_3^-$. Next, the concentrations A of both compounds were determined by semi-quantitation by the absolute calibration curve method using the commercially available reagent $CH_3CH_2CH_2SO_3Na$.

Based on the IC/MS analysis results, it was not possible to determine whether the detected $CH_3CH_2CH_2SO_3^-$ was derived from $CH_3CH_2CH_2SO_3Li$ or $CH_3CH_2CH_2SO_3H$, and it was not possible to determine whether the $HOCH_2CH_2CH_2SO_3^-$ was derived from $LiOCH_2CH_2CH_2SO_3Li$, $HOCH_2CH_2CH_2SO_3Li$ or $HOCH_2CH_2CH_2SO_3H$. Considering the presence of the electrolyte, however, they were considered to be a $CH_3CH_2CH_2SO_3Li$-derived compound and a $LiOCH_2CH_2CH_2SO_3Li$-derived compound, respectively.

(2) The same negative electrode body liquid extract as in (1) was placed in a 3 mmϕ NMR tube (PN-002 by Shigemi Corp.) and inserted into a 5 mmϕ NMR tube (N-5 by Nihon Seimitsu Kagaku Co., Ltd.) containing 1,2,4,5-tetrafluorobenzene-added deuterated chloroform, and $^1H$ NMR measurement was carried out by the double tube method. The normalization was carried out using the 7.1 ppm (m, 2H) signal of 1,2,4,5-tetrafluorobenzene, and the integral of each observed compound was calculated.

Deuterated chloroform containing dimethyl sulfoxide at known concentration was placed in a 3 mmϕ NMR tube (PN-002 by Shigemi Corp.) and inserted into a 5 mmϕ NMR tube (N-5 by Nihon Seimitsu Kagaku Co., Ltd.) containing the same 1,2,4,5-tetrafluorobenzene-added deuterated chloroform as above, and $^1H$ NMR measurement was carried out by the double tube method. In the same manner as above, the normalization was carried out using the 7.1 ppm (m, 2H) signal of 1,2,4,5-tetrafluorobenzene, and the integral of the 2.6 ppm (s, 6H) signal of dimethyl sulfoxide was calculated. Based on the relationship between the dimethyl sulfoxide concentration used and the integral, the concentration A of each compound in the negative electrode body liquid extract was determined.

Assignment for the $^1H$ NMR spectrum was as follows.
[For $CH_3O-X^7$ and $C_2H_5O-X^8$]
$CH_3OX^7$: 3.3 ppm (s, 3H)
$CH_3$ of $CH_3CH_2OX^8$: 1.2 ppm (t, 3H)
$CH_2O$ of $CH_3CH_2OX^8$: 3.7 ppm (q, 2H)

$X^7$ and $X^8$ both represent $-(COO)_nLi$ (where n is 0 or 1). For this example, the compounds were detected as mixtures comprising $CH_3OLi$, $CH_3OCOOLi$, $CH_3CH_2OLi$ and $CH_3CH_2OCOOLi$ (same for the following examples and comparative examples).
[For $CH_3CH_2CH_2SO_3Li$]
Terminal $CH_3$: 1.0 ppm (t, 3H)
$CH_2$: 1.7 ppm (m, 2H)
$CH_2S$: 2.9 ppm (t, 2H)

$CH_3CH_2CH_2SO_3Li$ or $CH_3CH_2CH_2SO_3H$ could not be discerned even from the NMR analysis results, but considering the presence of the electrolyte, it was considered to be $CH_3CH_2CH_2SO_3Li$.

Based on the concentration in the liquid extract of each compound determined by analysis in (1) and (2), the volume of heavy water used for extraction, and the mass of the active material of the negative electrode used for extraction, $CH_3O-X$ was present at $4.2\times10^{-4}$ mol/g and $CH_3CH_2O-X$ was present at $3.6\times10^{-4}$ mol/g in the negative electrode body. Also present were $CH_3CH_2CH_2SO_3X$ (compound (A)) at $8.0\times10^{-7}$ mol/g, $HOCH_2CH_2CH_2SO_3X$ (compound (B)) at $4.0\times10^{-7}$ mol/g and $XO_3S(CH_2)_6SO_3X$ (compound (C)) at $1.8\times10^{-6}$ mol/g.

For the calculation, the signal near 3 ppm other than of compounds (A) to (C) was considered to be derived from $CH_2$ adjacent to the S atom of compound (C).

<Measurement of Electrostatic Capacity>

The completed non-aqueous lithium-type power storage element was charged to 3.8 V by constant-current/constant-voltage charge held for a constant-voltage charge time of 1 hour with a current value of 1.5 C, and then subjected to constant-current discharge to 2.2 V at a current value of 1.5 C. The capacity Q and voltage change values during this time were used for calculation according to $F=Q/(3.8-2.2)$, by which it was determined that the electrostatic capacity F of the power storage element was 1,000 F.

<Measurement of Internal Resistance>

The completed non-aqueous lithium-type power storage element was subjected to constant-current charge until reaching 3.8 V at a current value of 1.5 C, and then to constant-current/constant-voltage charge in which a constant voltage of 3.8 V was applied, for a total time of constant-current charge and constant-current/constant-voltage charge of 2 hours.

It was then subjected to constant-current discharge to 2.2 V at a current value of 50 C. In the discharge curve (time-voltage) obtained during this time, E0 was recorded as the voltage value obtained by extrapolation to discharge time=0 seconds, by straight line approximation from the voltage values at discharge times 2 seconds and 4 seconds. During this time, the internal resistance R was calculated by internal resistance $R=\Delta E/(50\ C\ (current\ value))$, based on the relationship voltage drop $(\Delta E)=3.8-E0$. The time constant determined as the product of the electrostatic capacity F and internal resistance R was 1.60 ΩF.

<Measurement of Quantity of the Gas Generated During Storage>

The completed non-aqueous lithium-type power storage element was subjected to a storage test under conditions of 4.0 V cell voltage and 60° C. environmental temperature. In order to maintain the cell voltage of 4.0 V, 4.0 V charging was conducted for 2 hours at a current value of 1.5 C, before storage and each week after the start of the storage. The gas generation volume after 2 months of storage was measured at 25° C. and found to be $13\times10^{-3}$ cc/F.

Examples 2 to 13 and 26 to 62, and Comparative Examples 1 and 2

Non-aqueous electrolytes were prepared in the same manner as Example 1, except that in [Preparation of electrolyte] in Example 1, the volume ratio of ethylene carbonate (EC) and methylethyl carbonate (MEC), the concentration of $LiPF_6$ and the types and amounts of additives were as shown in Table 1, and these were used for assembly of power storage elements and evaluation. The evaluation results are shown in Tables 2 to 4.

Example 14

[Fabrication of Positive Electrode Body]

For the phenol resin, after carbonization for 2 hours in a firing furnace at 600° C. under a nitrogen gas atmosphere, it was pulverized with a ball mill and sorted, to obtain a carbonized material having a mean particle size of 7 μm. The carbonized material and KOH were mixed at a mass ratio of 1:5, and heated for 1 hour in a firing furnace at 800° C. under a nitrogen gas atmosphere, for activation. The mixture was subsequently stirred and washed for 1 hour in dilute hydrochloric acid adjusted to a concentration of 2 mol/L, and then boiled and washed with distilled water until the pH stabilized to between 5 and 6, after which it was dried to produce activated carbon 2.

When the obtained activated carbon 2 was measured in the same manner as Example 1, the mesopore volume V1 was 1.50 cc/g, the micropore volume V2 was 2.28 cc/g and the BET specific surface area was 3,627 m$^2$/g.

A slurry was obtained by mixing 80.8 parts by weight of activated carbon 2, 6.2 parts by weight of Ketchen black, 10 parts by weight of PVDF (polyvinylidene fluoride), 3.0 parts by weight of PVP (polyvinylpyrrolidone) and NMP (N-methylpyrrolidone). The obtained slurry was coated onto one or both sides of a collector made of aluminum foil with a thickness of 15 μm, and dried and pressed, to obtain a positive electrode body with a positive electrode active material layer thickness of 55 μm per side.

[Fabrication of Negative Electrode Body]

For Example 14 there were used:

commercially available coconut shell activated carbon as activated carbon (of the same type in Example 1), and coal pitch (softening point: 90° C.) as a carbonaceous material precursor.

A 150 g portion of the activated carbon was placed into a stainless steel mesh basket and placed on a stainless steel vat containing 150 g of coal pitch (softening point: 90° C.), and set in an electric furnace (furnace inner usable dimension: 300 mm×300 mm×300 mm), for thermal reaction to obtain composite porous material 2. The heat treatment was temperature increase to 630° C. over a period of 2 hours under a nitrogen atmosphere, and 4 hours of holding at the same temperature. It was then allowed to naturally cool to 60° C., after which the composite porous material 2 to be used as the negative electrode material was removed out of the furnace.

The obtained composite porous material 2 had a mass ratio of 38% of coated carbonaceous material with respect to activated carbon, a BET specific surface area of 434 m$^2$/g, a mesopore volume (Vm1) of 0.220 cc/g and a micropore volume (Vm2) of 0.149 cc/g. A laser diffraction particle size distribution analyzer by Shimadzu Corp. (SALD-2000J) was used to measure the mean particle size, which was found to be 2.88 μm.

A slurry was then obtained by mixing 83.4 parts by weight of the obtained composite porous material 2, 8.3 parts by weight of acetylene black, 8.3 parts by weight of PVDF (polyvinylidene fluoride) and NMP (N-methylpyrrolidone). The obtained slurry was coated onto both sides of an expanded copper foil, and then dried and pressed to obtain a negative electrode body with a negative electrode active material layer having a single-side thickness of 30 μm. On one side of the double-side coated negative electrode body there was attached a lithium metal foil in an amount corresponding to 1500 mAh/g per unit weight of the composite porous material 2.

[Preparation of Electrolyte]

As a non-aqueous electrolyte there was used a solution obtained by dissolving, in a mixed solvent comprising ethylene carbonate (EC):methyl ethyl carbonate (MEC) in a volume ratio of 1:2, LiPF$_6$ in an amount for a concentration of 1 mol/l and 1,3-propane sultone (1,3-PS) in an amount for 1 wt %, with respect to the total electrolyte.

[Assembly and Evaluation of Power Storage Element]

Power storage elements were assembled in the same manner as Example 1, except for using the positive electrode, negative electrode and electrolyte obtained above, and subjected to performance evaluation.

The evaluation results are shown in Tables 2 to 4.

Examples 15 to 25 and Comparative Example 3

Non-aqueous electrolytes were prepared in the same manner as Example 14, except that in [Preparation of electrolyte] in Example 14, the volume ratio of ethylene carbonate (EC) and methylethyl carbonate (MEC), the concentration of LiPF$_6$ and the types and amounts of additives were as shown in Table 1, and these were used for assembly of power storage elements and evaluation. The evaluation results are shown in Tables 2 to 4.

Comparative Example 4

[Fabrication of Negative Electrode Body]

Coal tar was heat treated at 450° C. for 1 hour to produce a graphite precursor in a pitch matrix. Tar heavy oil was then used as an extraction solvent to remove the graphite precursor from the mixture, to obtain a graphite precursor from the pitch matrix. The obtained graphite precursor was sintered once for 3 hours in a nitrogen gas stream at 500° C., and then cooled to room temperature. It was placed in a graphite vessel and subjected to high-temperature heat treatment at 3,000° C. for 1 hour in a nitrogen gas stream, to obtain graphite.

The graphite had a BET specific surface area of 1 m$^2$/g and a mean particle size of 13 μm.

A slurry was obtained by mixing 93 parts by weight of the obtained graphite, 2 parts by weight of acetylene black, 5 parts by weight of PVDF (polyvinylidene fluoride), and NMP (N-methylpyrrolidone). The obtained slurry was coated onto both sides of an expanded copper foil, and then dried and pressed to obtain a negative electrode body with a negative electrode active material layer having a single-side thickness of 30 μm. On one side of the double-side coated negative electrode body there was attached a lithium metal foil in an amount corresponding to 290 mAh/g per unit weight of the graphite.

[Preparation of Electrolyte]

As a non-aqueous electrolyte there was used a solution obtained by dissolving, in a mixed solvent comprising ethylene carbonate (EC):methyl ethyl carbonate (MEC) in a volume ratio of 1:2, LiPF$_6$ in an amount for a concentration of 1 mol/l, with respect to the total electrolyte.

[Assembly and Evaluation of Power Storage Element]

Power storage elements were assembled in the same manner as Example 1, except for using the negative electrode body and electrolyte obtained above, and subjected to performance evaluation. The evaluation results are shown in Tables 2 to 4.

Comparative Examples 5 to 8

Non-aqueous electrolytes were prepared in the same manner as Comparative Example 4, except for further adding additives of the types and amounts listed in Table 1 to the mixed solvent in [Preparation of electrolyte] in Comparative Example 4, and were used for assembly of power storage elements which were then evaluated. The evaluation results are shown in Tables 2 to 4.

Example 63

[Preparation of Electrolyte]

As a non-aqueous electrolyte there was used a solution obtained using propylene carbonate (PC), and dissolving LiPF$_6$ in an amount for a concentration of 1 mol/l and, as an additive, 1,3-propane sultone (1,3-PS) in an amount for 1 wt %, with respect to the total electrolyte.

[Assembly and Evaluation of Power Storage Element]

A power storage element was assembled in the same manner as Example 14, except for using the electrolyte obtained above, and was subjected to performance evaluation. The evaluation results are shown in Tables 2 to 4.

Examples 64 and 65 and Comparative Example 9

Non-aqueous electrolytes were prepared in the same manner as Example 63, except that the amount of 1,3-propane sultone (1,3-PS) used as an additive in [Preparation of electrolyte] of Example 63 were as listed in Table 1, and were used for assembly of power storage elements which were then evaluated. The evaluation results are shown in Table 2 to 4.

The results for Examples 1 to 65 and Comparative Examples 1 to 9 are summarized in Tables 1 to 4.

[Table 1]

Table 1. Electrolyte composition ratios before injection into power storage elements (1 of 3)

TABLE 1

Table 1. Electrolyte composition ratios before injection into power storage elements

| Example | Li salt (LiPF$_6$, mol/L w.r.t. total electrolyte) | EC (volume ratio) | PC (volume ratio) | MEC (volume ratio) | 1,3-PS | 2,4-BS | Propene sultone | 2,4-Pentane sultone | Cyclodisone | PN | FE | VC | FEC |
|---|---|---|---|---|---|---|---|---|---|---|---|---|---|
| Example 1 | 1 | 1 | | 2 | 0.3 | | | | | | | | |
| Example 2 | 1 | 1 | | 2 | 0.6 | | | | | | | | |
| Example 3 | 1 | 1 | | 2 | 1 | | | | | | | | |
| Example 4 | 1 | 1 | | 2 | 5 | | | | | | | | |
| Example 5 | 1 | 1 | | 2 | 10 | | | | | | | | |
| Example 6 | 1 | 1 | | 2 | 15 | | | | | | | | |
| Example 7 | 1 | 1 | | 2 | 5 | | | | | 5 | | | |
| Example 8 | 1 | 1 | | 2 | 5 | | | | | | 2 | | |
| Example 9 | 1 | 1 | | 2 | 5 | | | | | 5 | 2 | | |
| Example 10 | 1 | 1 | | 2 | 5 | | | | | | | 2 | |
| Example 11 | 1 | 1 | | 2 | 5 | | | | | 5 | | 2 | |
| Example 12 | 1 | 1 | | 2 | 5 | | | | | | | | 2 |
| Example 13 | 1 | 1 | | 2 | 5 | | | | | 5 | | | 2 |
| Comp. Ex. 1 | 1 | 1 | | 2 | 0.3 | | | | | | | | |
| Comp. Ex. 2 | 1 | 1 | | 2 | 25 | | | | | | | | |
| Example 14 | 1 | 1 | | 2 | 1 | | | | | | | | |
| Example 15 | 1 | 1 | | 2 | 5 | | | | | | | | |
| Example 16 | 1 | 1 | | 2 | 10 | | | | | | | | |
| Example 17 | 1 | 1 | | 2 | 15 | | | | | | | | |
| Example 18 | 1 | 1 | | 2 | 23 | | | | | | | | |
| Example 19 | 1 | 1 | | 2 | 5 | | | | | 5 | | | |
| Example 20 | 1 | 1 | | 2 | 5 | | | | | | 2 | | |
| Example 21 | 1 | 1 | | 2 | 5 | | | | | 5 | 2 | | |
| Example 22 | 1 | 1 | | 2 | 5 | | | | | | | 2 | |
| Example 23 | 1 | 1 | | 2 | 5 | | | | | 5 | | 2 | |
| Example 24 | 1 | 1 | | 2 | 5 | | | | | | | | 2 |
| Example 25 | 1 | 1 | | 2 | 5 | | | | | 5 | | | 2 |
| Comp. Ex. 3 | 1 | 1 | | 2 | | | | | | | | | |
| Example 26 | 1 | 1 | | 2 | | 1 | | | | | | | |
| Example 27 | 1 | 1 | | 2 | | 5 | | | | | | | |
| Example 28 | 1 | 1 | | 2 | | 10 | | | | | | | |
| Example 29 | 1 | 1 | | 2 | | 15 | | | | | | | |
| Example 30 | 1 | 1 | | 2 | | 5 | | | | 5 | | | |
| Example 31 | 1 | 1 | | 2 | | 5 | | | | | 2 | | |
| Example 32 | 1 | 1 | | 2 | | 5 | | | | 5 | 2 | | |
| Example 33 | 1 | 1 | | 2 | | 5 | | | | | | 2 | |
| Example 34 | 1 | 1 | | 2 | | 5 | | | | 5 | | 2 | |
| Example 35 | 1 | 1 | | 2 | | 5 | | | | | | | 2 |
| Example 36 | 1 | 1 | | 2 | | 5 | | | | 5 | | | 2 |
| Example 37 | 1 | 1 | | 2 | | | 1 | | | | | | |
| Example 38 | 1 | 1 | | 2 | | | 5 | | | | | | |
| Example 39 | 1 | 1 | | 2 | | | 10 | | | | | | |
| Example 40 | 1 | 1 | | 2 | | | 15 | | | | | | |
| Example 41 | 1 | 1 | | 2 | | | 5 | | | 5 | | | |
| Example 42 | 1 | 1 | | 2 | | | 5 | | | | 2 | | |
| Example 43 | 1 | 1 | | 2 | | | 5 | | | 5 | 2 | | |
| Example 44 | 1 | 1 | | 2 | | | 5 | | | | | 2 | |
| Example 45 | 1 | 1 | | 2 | | | 5 | | | 5 | | 2 | |
| Example 46 | 1 | 1 | | 2 | | | 5 | | | | | | 2 |
| Example 47 | 1 | 1 | | 2 | | | 5 | | | 5 | | | 2 |
| Example 48 | 1 | 1 | | 2 | | | | 1 | | | | | |
| Example 49 | 1 | 1 | | 2 | | | | 5 | | | | | |
| Example 50 | 1 | 1 | | 2 | | | | 10 | | | | | |
| Example 51 | 1 | 1 | | 2 | | | | 15 | | | | | |
| Example 52 | 1 | 1 | | 2 | | | | 5 | | 5 | | | |

TABLE 1-continued

Table 1. Electrolyte composition ratios before injection into power storage elements

| | | Solvent | | | | | | | | | | | |
| --- | --- | --- | --- | --- | --- | --- | --- | --- | --- | --- | --- | --- | --- |
| | Li salt (LiPF$_6$) | EC | PC | MEC | Additives (wt % w.r.t. total electrolyte) | | | | | | | | |
| Example | mol/L w.r.t. total electrolyte | (volume ratio) | (volume ratio) | (volume ratio) | 1,3-PS | 2,4-BS | Propene sultone | 2,4-Pentane sultone | Cyclodisone | PN | FE | VC | FEC |
| Example 53 | 1 | 1 | | 2 | | | | 5 | | | | 2 | |
| Example 54 | 1 | 1 | | 2 | | | | 5 | | | 5 | 2 | |
| Example 55 | 1 | 1 | | 2 | | | | 5 | | | | | 2 |
| Example 56 | 1 | 1 | | 2 | | | | 5 | | | 5 | | 2 |
| Example 57 | 1 | 1 | | 2 | | | | 5 | | | | | 2 |
| Example 58 | 1 | 1 | | 2 | | | | 5 | | | 5 | | 2 |
| Example 59 | 1 | 1 | | 2 | | | | | 1 | | | | |
| Example 60 | 1 | 1 | | 2 | | | | | 5 | | | | |
| Example 61 | 1 | 1 | | 2 | | | | | 10 | | | | |
| Example 62 | 1 | 1 | | 2 | | | | | 15 | | | | |
| Comp. Ex. 4 | 1 | 1 | | 2 | | | | | | | | | |
| Comp. Ex. 5 | 1 | 1 | | 2 | 0.1 | | | | | | | | |
| Comp. Ex. 6 | 1 | 1 | | 2 | 1 | | | | | | | | |
| Comp. Ex. 7 | 1 | 1 | | 2 | 5 | | | | | | | | |
| Comp. Ex. 8 | 1 | 1 | | 2 | 15 | | | | | | | | |
| Example 63 | 1 | | 1 | | 1 | | | | | | | | |
| Example 64 | 1 | | 1 | | 5 | | | | | | | | |
| Example 65 | 1 | | 1 | | 10 | | | | | | | | |
| Comp. Ex. 9 | 1 | | 1 | | | | | | | | | | |

TABLE 4

Table 2. Electrolyte composition ratios in power storage elements after completion of power storage elements

| | Li salt (LiPF$_6$) | Linear carbonate (vol % w.r.t. | Additives (wt % w.r.t. total electrolyte) | | | | | | | | |
| --- | --- | --- | --- | --- | --- | --- | --- | --- | --- | --- | --- |
| Example | mol/L w.r.t. total electrolyte | total electrolyte excluding Li salt) | 1,3-PS | 2,4-BS | Propene sultone | 2,4-Pentane sultone | Cyclodisone | PN | FE | VC | FEC |
| Example 1 | 1 | 66 | 0.25 | | | | | | | | |
| Example 2 | 1 | 66 | 0.5 | | | | | | | | |
| Example 3 | 1 | 66 | 0.9 | | | | | | | | |
| Example 4 | 1 | 63 | 4.7 | | | | | | | | |
| Example 5 | 1 | 60 | 9.5 | | | | | | | | |
| Example 6 | 1 | 57 | 14 | | | | | | | | |
| Example 7 | 1 | 60 | 4.7 | | | | | 4 | | | |
| Example 8 | 1 | 62 | 4.7 | | | | | | 1.8 | | |
| Example 9 | 1 | 59 | 4.7 | | | | | 4 | 1.8 | | |
| Example 10 | 1 | 62 | 4.7 | | | | | | | 0.5 | |
| Example 11 | 1 | 59 | 4.7 | | | | | 4 | | 0.5 | |
| Example 12 | 1 | 62 | 4.7 | | | | | | | | 1.8 |
| Example 13 | 1 | 59 | 4.7 | | | | | 4 | | | 1.8 |
| Comp. Ex. 1 | 1 | 66 | | | | | | | | | |
| Comp. Ex. 2 | 1 | 52 | 22 | | | | | | | | |
| Example 14 | 1 | 66 | 0.8 | | | | | | | | |
| Example 15 | 1 | 63 | 4.5 | | | | | | | | |
| Example 16 | 1 | 60 | 9 | | | | | | | | |
| Example 17 | 1 | 58 | 13 | | | | | | | | |
| Example 18 | 1 | 53 | 20 | | | | | | | | |
| Example 19 | 1 | 60 | 4.5 | | | | | 3.5 | | | |
| Example 20 | 1 | 62 | 4.5 | | | | | | 1.7 | | |
| Example 21 | 1 | 59 | 4.5 | | | | | 3.5 | 1.7 | | |
| Example 22 | 1 | 62 | 4.5 | | | | | | | 0.3 | |
| Example 23 | 1 | 59 | 4.5 | | | | | 3.5 | | 0.3 | |
| Example 24 | 1 | 62 | 4.5 | | | | | | | | 1.7 |
| Example 25 | 1 | 59 | 4.5 | | | | | 3.5 | | | 1.7 |
| Comp. Ex. 3 | 1 | 66 | | | | | | | | | |
| Example 26 | 1 | 66 | | 0.9 | | | | | | | |
| Example 27 | 1 | 63 | | 4.7 | | | | | | | |
| Example 28 | 1 | 60 | | 9.5 | | | | | | | |
| Example 29 | 1 | 56 | | 14 | | | | | | | |
| Example 30 | 1 | 60 | | 4.7 | | | | 4 | | | |
| Example 31 | 1 | 62 | | 4.7 | | | | | 1.8 | | |
| Example 32 | 1 | 58 | | 4.7 | | | | 4 | 1.8 | | |
| Example 33 | 1 | 62 | | 4.7 | | | | | | 0.5 | |
| Example 34 | 1 | 58 | | 4.7 | | | | 4 | | 0.5 | |
| Example 35 | 1 | 62 | | 4.7 | | | | | | | 1.8 |

TABLE 4-continued

Table 2. Electrolyte composition ratios in power storage elements after completion of power storage elements

| Example | Li salt (LiPF$_6$, mol/L w.r.t. total electrolyte) | Linear carbonate (vol % w.r.t. total electrolyte excluding Li salt) | 1,3-PS | 2,4-BS | Propene sultone | 2,4-Pentane sultone | Cyclodisone | PN | FE | VC | FEC |
|---|---|---|---|---|---|---|---|---|---|---|---|
| Example 36 | 1 | 58 | | 4.7 | | | | 4 | | | 1.8 |
| Example 37 | 1 | 66 | | 0.9 | | | | | | | |
| Example 38 | 1 | 63 | | 4.7 | | | | | | | |
| Example 39 | 1 | 60 | | 9.5 | | | | | | | |
| Example 40 | 1 | 56 | | 14 | | | | | | | |
| Example 41 | 1 | 60 | | 4.7 | | | | 4 | | | |
| Example 42 | 1 | 62 | | 4.7 | | | | | 1.8 | | |
| Example 43 | 1 | 58 | | 4.7 | | | | 4 | 1.8 | | |
| Example 44 | 1 | 62 | | 4.7 | | | | | | 0.5 | |
| Example 45 | 1 | 58 | | 4.7 | | | | 4 | | 0.5 | |
| Example 46 | 1 | 62 | | 4.7 | | | | | | | 1.8 |
| Example 47 | 1 | 58 | | 4.7 | | | | 4 | | | 1.8 |
| Example 48 | 1 | 66 | | | | 0.9 | | | | | |
| Example 49 | 1 | 63 | | | | 4.7 | | | | | |
| Example 50 | 1 | 60 | | | | 9.5 | | | | | |
| Example 51 | 1 | 56 | | | | 14 | | | | | |
| Example 52 | 1 | 60 | | | | 4.7 | | 4 | | | |
| Example 53 | 1 | 62 | | | | 4.7 | | | 1.8 | | |
| Example 54 | 1 | 58 | | | | 4.7 | | 4 | 1.8 | | |
| Example 55 | 1 | 62 | | | | 4.7 | | | | 0.5 | |
| Example 56 | 1 | 58 | | | | 4.7 | | 4 | | 0.5 | |
| Example 57 | 1 | 62 | | | | 4.7 | | | | | 1.8 |
| Example 58 | 1 | 58 | | | | 4.7 | | 4 | | | 1.8 |
| Example 59 | 1 | 66 | | | | | 0.25 | | | | |
| Example 60 | 1 | 63 | | | | | 1.5 | | | | |
| Example 61 | 1 | 60 | | | | | 3 | | | | |
| Example 62 | 1 | 56 | | | | | 5 | | | | |
| Comp. Ex. 4 | 1 | 66 | | | | | | | | | |
| Comp. Ex. 5 | 1 | 66 | 0.09998 | | | | | | | | |
| Comp. Ex. 6 | 1 | 66 | 0.998 | | | | | | | | |
| Comp. Ex. 7 | 1 | 63 | 4.98 | | | | | | | | |
| Comp. Ex. 8 | 1 | 57 | 14.9 | | | | | | | | |
| Example 63 | 1 | 0 | 0.8 | | | | | | | | |
| Example 64 | 1 | 0 | 4.5 | | | | | | | | |
| Example 65 | 1 | 0 | 9 | | | | | | | | |
| Comp. Ex. 9 | 1 | 0 | | | | | | | | | |

TABLE 7

Table 3. Structures of power storage devices, and cell properties

| | Negative electrode | | | Positive electrode | | Cell properties | | |
|---|---|---|---|---|---|---|---|---|
| Example | Composite material 1 | Composite material 2 | Graphite | Activated carbon 1 | Activated carbon 2 | Electrostatic capacity (F) | Internal resistance (time constant) (ΩF) | Gas generation volume after 2 months storage (×10$^{-3}$ cc/F) |
| Example 1 | ○ | | | ○ | | 1000 | 1.60 | 13.0 |
| Example 2 | ○ | | | ○ | | 1000 | 1.60 | 11.5 |
| Example 3 | ○ | | | ○ | | 1000 | 1.60 | 10.0 |
| Example 4 | ○ | | | ○ | | 1000 | 1.60 | 4.5 |
| Example 5 | ○ | | | ○ | | 1000 | 1.70 | 4.0 |
| Example 6 | ○ | | | ○ | | 1000 | 1.75 | 1.5 |
| Example 7 | ○ | | | ○ | | 1000 | 1.65 | 2.5 |
| Example 8 | ○ | | | ○ | | 1000 | 1.70 | 4.0 |
| Example 9 | ○ | | | ○ | | 1000 | 1.80 | 2.0 |
| Example 10 | ○ | | | ○ | | 1000 | 1.75 | 5.0 |
| Example 11 | ○ | | | ○ | | 1000 | 1.80 | 2.5 |
| Example 12 | ○ | | | ○ | | 1000 | 1.70 | 6.0 |
| Example 13 | ○ | | | ○ | | 1000 | 1.80 | 2.5 |
| Comp. Ex. 1 | ○ | | | ○ | | 1000 | 1.60 | 15.0 |
| Comp. Ex. 2 | ○ | | | ○ | | 1000 | 2.50 | 0.8 |
| Example 14 | | ○ | | | ○ | 1500 | 1.60 | 10.0 |
| Example 15 | | ○ | | | ○ | 1500 | 1.60 | 4.5 |
| Example 16 | | ○ | | | ○ | 1500 | 1.70 | 4.0 |

TABLE 7-continued

Table 3. Structures of power storage devices, and cell properties

| | Negative electrode | | | Positive electrode | | Cell properties | | |
|---|---|---|---|---|---|---|---|---|
| | Composite material 1 | Composite material 2 | Graphite | Activated carbon 1 | Activated carbon 2 | Electrostatic capacity (F) | Internal resistance (time constant) (ΩF) | Gas generation volume after 2 months storage (×10⁻³ cc/F) |
| Example | | | | | | | | |
| Example 17 | | ○ | | | ○ | 1500 | 1.75 | 1.5 |
| Example 18 | | ○ | | | ○ | 1500 | 2.35 | 1.1 |
| Example 19 | | ○ | | | ○ | 1500 | 1.65 | 2.5 |
| Example 20 | | ○ | | | ○ | 1500 | 1.70 | 4.0 |
| Example 21 | | ○ | | | ○ | 1500 | 1.80 | 2.0 |
| Example 22 | | ○ | | | ○ | 1500 | 1.75 | 5.0 |
| Example 23 | | ○ | | | ○ | 1500 | 1.80 | 2.5 |
| Example 24 | | ○ | | | ○ | 1500 | 1.70 | 6.0 |
| Example 25 | | ○ | | | ○ | 1500 | 1.80 | 2.5 |
| Comp. Ex. 3 | | ○ | | | ○ | 1500 | 1.60 | 13.3 |
| Example 26 | ○ | | | ○ | | 1000 | 1.60 | 11.0 |
| Example 27 | ○ | | | ○ | | 1000 | 1.65 | 5.0 |
| Example 28 | ○ | | | ○ | | 1000 | 1.75 | 4.4 |
| Example 29 | ○ | | | ○ | | 1000 | 1.80 | 1.7 |
| Example 30 | ○ | | | ○ | | 1000 | 1.65 | 2.8 |
| Example 31 | ○ | | | ○ | | 1000 | 1.77 | 4.4 |
| Example 32 | ○ | | | ○ | | 1000 | 1.83 | 2.2 |
| Example 33 | ○ | | | ○ | | 1000 | 1.80 | 5.5 |
| Example 34 | ○ | | | ○ | | 1000 | 1.85 | 2.5 |
| Example 35 | ○ | | | ○ | | 1000 | 1.75 | 6.5 |
| Example 36 | ○ | | | ○ | | 1000 | 1.85 | 2.8 |
| Example 37 | ○ | | | ○ | | 1000 | 1.65 | 11.0 |
| Example 38 | ○ | | | ○ | | 1000 | 1.70 | 5.0 |
| Example 39 | ○ | | | ○ | | 1000 | 1.85 | 4.4 |
| Example 40 | ○ | | | ○ | | 1000 | 1.97 | 1.7 |
| Example 41 | ○ | | | ○ | | 1000 | 1.70 | 2.8 |
| Example 42 | ○ | | | ○ | | 1000 | 1.82 | 4.4 |
| Example 43 | ○ | | | ○ | | 1000 | 1.87 | 2.2 |
| Example 44 | ○ | | | ○ | | 1000 | 1.85 | 5.5 |
| Example 45 | ○ | | | ○ | | 1000 | 1.90 | 2.5 |
| Example 46 | ○ | | | ○ | | 1000 | 1.80 | 6.5 |
| Example 47 | ○ | | | ○ | | 1000 | 1.90 | 2.8 |
| Example 48 | ○ | | | ○ | | 1000 | 1.60 | 12.0 |
| Example 49 | ○ | | | ○ | | 1000 | 1.65 | 5.4 |
| Example 50 | ○ | | | ○ | | 1000 | 1.75 | 4.8 |
| Example 51 | ○ | | | ○ | | 1000 | 1.80 | 1.8 |
| Example 52 | ○ | | | ○ | | 1000 | 1.65 | 3.0 |
| Example 53 | ○ | | | ○ | | 1000 | 1.75 | 4.8 |
| Example 54 | ○ | | | ○ | | 1000 | 1.80 | 2.4 |
| Example 55 | ○ | | | ○ | | 1000 | 1.80 | 6.0 |
| Example 56 | ○ | | | ○ | | 1000 | 1.85 | 2.8 |
| Example 57 | ○ | | | ○ | | 1000 | 1.75 | 7.5 |
| Example 58 | ○ | | | ○ | | 1000 | 1.85 | 3.0 |
| Example 59 | ○ | | | ○ | | 1000 | 1.60 | 9.0 |
| Example 60 | ○ | | | ○ | | 1000 | 1.60 | 4.0 |
| Example 61 | ○ | | | ○ | | 1000 | 1.67 | 4.0 |
| Example 62 | ○ | | | ○ | | 1000 | 1.72 | 1.5 |
| Comp. Ex. 4 | | | ○ | ○ | | 1000 | 21.0 | 12.0 |
| Comp. Ex. 5 | | | ○ | ○ | | 1000 | 21.3 | 11.7 |
| Comp. Ex. 6 | | | ○ | ○ | | 1000 | 27.0 | 6.8 |
| Comp. Ex. 7 | | | ○ | ○ | | 1000 | 30.5 | 2.6 |
| Comp. Ex. 8 | | | ○ | ○ | | 1000 | 35.0 | 1.0 |
| Example 63 | | ○ | | | ○ | 1500 | 2.15 | 7.5 |
| Example 64 | | ○ | | | ○ | 1500 | 2.25 | 2.5 |
| Example 65 | | ○ | | | ○ | 1500 | 2.37 | 1.0 |
| Comp. Ex. 9 | | ○ | | | ○ | 1500 | 2.10 | 13.1 |

TABLE 9

Table 4. Amounts of compounds in negative electrode active material layers

| | Compounds in negative electrode active material layers | | | | | | | |
|---|---|---|---|---|---|---|---|---|
| | Sulfur compounds | | | | | $CH_3$—$X^7$ and/or $C_2H_5$—$X^8$ | | |
| | $R_7SO_3X$, (A) ($\times 10^{-6}$ mol/g) | $HORSO_3X$, (B) ($\times 10^{-6}$ mol/g) | $XO_3SRSO_3X$, (C) ($\times 10^{-6}$ mol/g) | Compound (A) + (B) + (C) ($\times 10^{-6}$ mol/g) | Compound (A) + (C) ($\times 10^{-6}$ mol/g) | $CH_3$—$OX^7$ ($\times 10^{-4}$ mol/g) | $C_2H_5$—$OX^8$ ($\times 10^{-4}$ mol/g) | Total ($\times 10^{-4}$ mol/g) |
| Example 1 | 0.80 | 0.40 | 1.8 | 3.0 | 2.6 | 4.2 | 3.6 | 7.8 |
| Example 2 | 2.0 | 2.8 | 3.2 | 8.0 | 5.2 | 2.8 | 2.2 | 4.8 |
| Example 3 | 5.2 | 37 | 11 | 53 | 16 | 1.6 | 1.3 | 2.9 |
| Example 4 | 21 | 37 | 52 | 110 | 73 | 1.3 | 1.1 | 2.4 |
| Example 5 | 52 | 150 | 110 | 310 | 160 | 1.0 | 0.8 | 1.8 |
| Example 6 | 52 | 200 | 160 | 410 | 210 | 0.7 | 0.6 | 1.3 |
| Example 7 | 30 | 60 | 40 | 130 | 70 | 1.3 | 1.1 | 2.4 |
| Example 8 | 31 | 45 | 44 | 120 | 75 | 1.4 | 1.2 | 2.6 |
| Example 9 | 31 | 97 | 42 | 170 | 73 | 1.5 | 1.3 | 2.8 |
| Example 10 | 29 | 57 | 64 | 150 | 93 | 1.3 | 1.2 | 2.5 |
| Example 11 | 28 | 100 | 48 | 180 | 76 | 1.3 | 1.2 | 2.5 |
| Example 12 | 31 | 70 | 49 | 150 | 80 | 1.5 | 1.3 | 2.8 |
| Example 13 | 34 | 110 | 48 | 190 | 82 | 1.5 | 1.2 | 2.7 |
| Comp. Ex. 1 | 0 | 0 | 0 | 0 | 0 | 5.0 | 3.0 | 8.0 |
| Comp. Ex. 2 | 320 | 1300 | 600 | 2200 | 920 | 0.5 | 0.5 | 1.0 |
| Example 14 | 20 | 42 | 28 | 90 | 48 | 3.0 | 1.8 | 4.8 |
| Example 15 | 60 | 130 | 160 | 350 | 220 | 2.4 | 1.6 | 4.0 |
| Example 16 | 200 | 350 | 240 | 790 | 440 | 2.0 | 1.4 | 3.4 |
| Example 17 | 300 | 220 | 470 | 990 | 770 | 1.4 | 1.0 | 2.4 |
| Example 18 | 500 | 1100 | 370 | 2000 | 870 | 0.50 | 0.45 | 0.95 |
| Example 19 | 60 | 160 | 140 | 360 | 200 | 2.4 | 1.4 | 3.8 |
| Example 20 | 70 | 70 | 160 | 300 | 230 | 2.4 | 1.6 | 4.0 |
| Example 21 | 90 | 100 | 180 | 370 | 270 | 2.5 | 1.6 | 4.1 |
| Example 22 | 100 | 100 | 200 | 400 | 300 | 2.2 | 1.5 | 3.7 |
| Example 23 | 90 | 150 | 150 | 390 | 240 | 2.3 | 1.6 | 3.9 |
| Example 24 | 80 | 130 | 140 | 350 | 220 | 2.3 | 1.7 | 4.0 |
| Example 25 | 100 | 70 | 170 | 340 | 270 | 2.5 | 1.6 | 4.1 |
| Comp. Ex. 3 | 0 | 0 | 0 | 0 | 0 | 8.0 | 4.0 | 12.0 |
| Example 26 | 10 | 37 | 10 | 57 | 20 | 1.6 | 1.3 | 2.9 |
| Example 27 | 20 | 40 | 60 | 120 | 80 | 1.2 | 1.0 | 2.2 |
| Example 28 | 50 | 150 | 100 | 300 | 150 | 1.0 | 0.7 | 1.7 |
| Example 29 | 100 | 170 | 120 | 390 | 220 | 0.9 | 0.5 | 1.4 |
| Example 30 | 25 | 40 | 55 | 120 | 80 | 1.3 | 1.0 | 2.3 |
| Example 31 | 30 | 32 | 48 | 110 | 78 | 1.5 | 1.2 | 2.7 |
| Example 32 | 21 | 52 | 57 | 130 | 78 | 1.6 | 1.2 | 2.8 |
| Example 33 | 10 | 39 | 10 | 59 | 20 | 1.8 | 1.3 | 3.1 |
| Example 34 | 24 | 56 | 60 | 140 | 84 | 1.3 | 1.1 | 2.4 |
| Example 35 | 70 | 15 | 110 | 330 | 180 | 1.1 | 0.9 | 2.0 |
| Example 36 | 80 | 220 | 140 | 440 | 220 | 0.8 | 0.6 | 1.4 |
| Example 37 | 30 | 22 | 38 | 90 | 68 | 1.4 | 0.8 | 2.2 |
| Example 38 | 20 | 45 | 55 | 120 | 75 | 1.5 | 1.0 | 2.5 |
| Example 39 | 24 | 33 | 63 | 120 | 87 | 1.4 | 1.1 | 2.5 |
| Example 40 | 31 | 53 | 46 | 130 | 77 | 2.0 | 1.0 | 3.0 |
| Example 41 | 23 | 31 | 56 | 110 | 79 | 1.7 | 1.1 | 2.8 |
| Example 42 | 32 | 84 | 44 | 160 | 76 | 1.6 | 1.0 | 2.6 |
| Example 43 | 33 | 100 | 43 | 180 | 76 | 1.5 | 1.4 | 2.9 |
| Example 44 | 30 | 100 | 40 | 170 | 70 | 1.6 | 1.1 | 2.7 |
| Example 45 | 35 | 110 | 46 | 190 | 81 | 1.7 | 1.3 | 3.0 |
| Example 46 | 36 | 110 | 49 | 190 | 85 | 1.8 | 1.3 | 3.1 |
| Example 47 | 29 | 90 | 51 | 170 | 80 | 2.1 | 1.5 | 3.6 |
| Example 48 | 12 | 48 | 10 | 70 | 22 | 1.8 | 1.1 | 2.9 |
| Example 49 | 38 | 50 | 52 | 140 | 90 | 1.5 | 1.2 | 2.7 |
| Example 50 | 81 | 170 | 99 | 350 | 180 | 1.2 | 0.8 | 2.0 |
| Example 51 | 120 | 220 | 130 | 470 | 250 | 1.1 | 0.7 | 1.8 |
| Example 52 | 33 | 70 | 37 | 140 | 70 | 1.4 | 1.2 | 2.6 |
| Example 53 | 32 | 66 | 52 | 150 | 84 | 1.5 | 1.2 | 2.7 |
| Example 54 | 38 | 52 | 90 | 180 | 90 | 1.6 | 1.3 | 2.9 |
| Example 55 | 39 | 57 | 54 | 150 | 93 | 1.8 | 1.2 | 3.0 |
| Example 56 | 41 | 100 | 56 | 200 | 97 | 1.6 | 1.1 | 2.7 |
| Example 57 | 40 | 42 | 48 | 130 | 88 | 1.6 | 1.0 | 2.6 |
| Example 58 | 28 | 100 | 52 | 180 | 80 | 1.6 | 1.1 | 2.7 |
| Comp. Ex. 4 | 0 | 0 | 0 | 0 | 0 | 0.06 | 0.04 | 0.10 |
| Comp. Ex. 5 | 0.00020 | 0.00007 | 0.00028 | 0.00055 | 0.00048 | 0.05 | 0.04 | 0.09 |
| Comp. Ex. 6 | 0.0010 | 0.0035 | 0.0005 | 0.0497 | 0.0150 | 0.04 | 0.03 | 0.07 |
| Comp. Ex. 7 | 0.050 | 0.042 | 0.022 | 0.114 | 0.0720 | 0.03 | 0.02 | 0.05 |

TABLE 9-continued

Table 4. Amounts of compounds in negative electrode active material layers

Compounds in negative electrode active material layers

| | Sulfur compounds | | | | | $CH_3O-X^7$ and/or $C_2H_5O-X^8$ | | |
|---|---|---|---|---|---|---|---|---|
| | $R_7SO_3X$, (A) ($\times 10^{-6}$ mol/g) | $HORSO_3X$, (B) ($\times 10^{-6}$ mol/g) | $XO_3SRSO_3X$, (C) ($\times 10^{-6}$ mol/g) | Compound (A) + (B) + (C) ($\times 10^{-6}$ mol/g) | Compound (A) + (C) ($\times 10^{-6}$ mol/g) | $CH_3-OX^7$ ($\times 10^{-4}$ mol/g) | $C_2H_5-OX^8$ ($\times 10^{-4}$ mol/g) | Total ($\times 10^{-4}$ mol/g) |
| Comp. Ex. 8 | 0.10 | 0.19 | 0.10 | 0.385 | 0.200 | 0.01 | 0.01 | 0.02 |
| Example 63 | 20 | 42 | 28 | 90 | 48 | — | — | — |
| Example 64 | 60 | 130 | 160 | 350 | 220 | — | — | — |
| Example 65 | 200 | 350 | 240 | 790 | 440 | — | — | — |
| Comp. Ex. 9 | 0 | 0 | 0 | 0 | 0 | — | — | — |

The names of the additives in Tables 1 and 2 are as follows.
1,3-PS: 1,3-Propane sultone
2,4-BS:
PN: Ethoxypentafluorocyclotriphosphazene
FE: $HCF_2CF_2OCH_2CF_2CF_2H$
VC: Vinylene carbonate
FEC: Fluoroethylene carbonate The circles in the "Positive electrode" and "Negative electrode" columns of Table 3 indicate that the materials in the corresponding column were used as active materials for the electrodes.

In Table 4, the substituents R for compounds (A) to (C) in the column "Sulfur compound" have the following meanings.

Examples 1 to 25 and 63 to 65, and Comparative Examples 2 and 5 to 8

R of compound (A): $CH_3CH_2CH_2-$
R of compound (B): $-CH_2CH_2CH_2-$
R of compound (C): $-(CH_2)_6-$ Examples 26 to 36

R of compound (A): $CH_3CH_2CH(CH_3)-$
R of compound (B): $-CH_2CH_2CH(CH_3)-$
R of compound (C): $-CH(CH_3)(CH_2)_4CH(CH_3)-$ Examples 37 to 47

R of compound (A): $CH_3CH=CH-$
R of compound (B): $-CH_2CH=CH-$
R of compound (C): $-CH=CH(CH_2)_2CH=CH-$ Examples 48 to 55, 57 and 58

R of compound (A): $CH_3CH_2CH_2CH(CH_3)-$
R of compound (B): $-CH(CH_3)CH_2CH(CH_3)-$
R of compound (C): $-CH(CH_3)(CH_2)_6CH(CH_3)-$ Example 56

R of compound (A): $CH_3CH(OH)CH_2CH(CH_3)-$
R of compound (B): $-CH_2CH=CH-$
R of compound (C): $-CH(CH_3)(CH_2)_6CH(CH_3)-$ In Examples 59 to 62, the same evaluation results were obtained as in Examples 3 to 6, respectively, except that sulfonic acid derivatives were detected in the [Analysis of negative electrode active material layer].

For Examples 1 to 6 and 14 to 18 and Comparative Examples 1 and 2, the relationships between the amounts of sulfur compounds in the negative electrode active materials (total for compounds (A) to (C) and total for compounds (A) and (C)), and the gas generation volumes after storage of the power storage elements for 2 months at 60° C., or the internal resistance values (time constants) for the power storage elements, were summarized. These relationships are shown in Table 5 and in FIGS. 1 and 2, respectively.

TABLE 5

Relationship between sulfur compound amounts in negative electrode active material layers, and cell properties

| | Sulfur compound amount ($\times 10^{-6}$ mol/g) | | Internal resistance (time constant) ($\Omega F$) | Gas generation volume after 2 months storage ($\times 10^{-3}$ cc/F) |
|---|---|---|---|---|
| | Compound (A) + (B) + (C) | Compound (A) + (C) | | |
| Example 1 | 3.0 | 2.6 | 1.60 | 13.0 |
| Example 2 | 8.0 | 5.2 | 1.60 | 11.5 |
| Example 3 | 53 | 16 | 1.60 | 10.0 |
| Example 4 | 110 | 73 | 1.60 | 4.5 |
| Example 5 | 310 | 160 | 1.70 | 4.0 |
| Example 6 | 410 | 210 | 1.75 | 1.5 |
| Comp. Ex. 1 | 0 | 0 | 1.60 | 15.0 |
| Comp. Ex. 2 | 2200 | 920 | 2.50 | 0.8 |
| Example 14 | 90 | 48 | 1.60 | 10.0 |
| Example 15 | 350 | 220 | 1.60 | 4.5 |
| Example 16 | 790 | 440 | 1.70 | 4.0 |
| Example 17 | 990 | 770 | 1.75 | 1.5 |
| Example 18 | 2000 | 870 | 2.35 | 1.1 |

Figure 2:
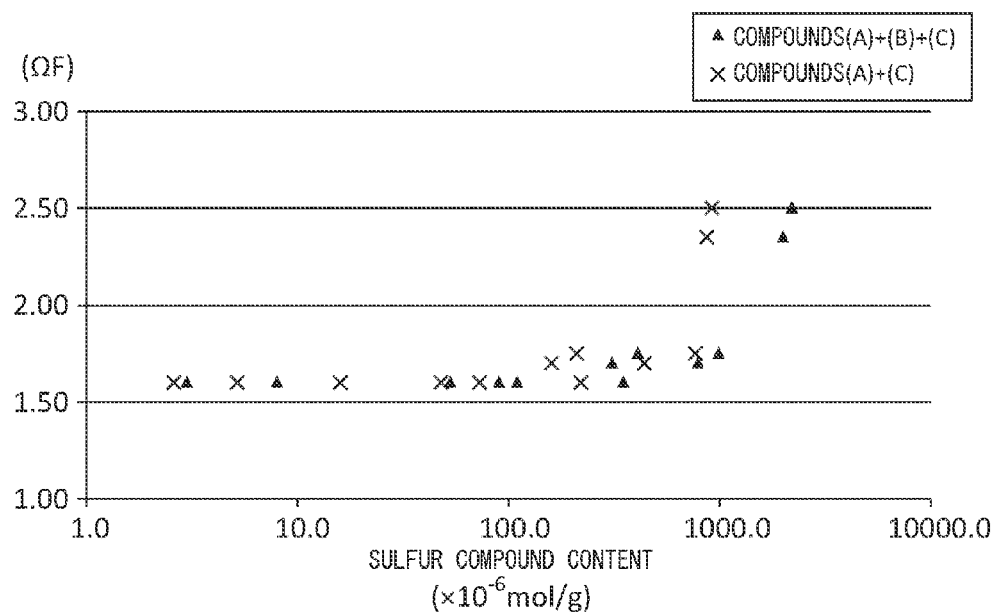
FIG. 2 is a graph showing the relationship between sulfur compound content in a negative electrode active material layer, and internal resistance (time constant) of a power storage element obtained in examples.

FIG. 1 shows that as the amount of sulfur compound in the negative electrode active material increases, the gas generation volume after storage of the power storage element for 2 months at high temperature decreases. On the other hand, the value of the internal resistance (time constant) of the power storage element is essentially maintained constant even when the sulfur compound amount increases, but if the sulfur compound amount (total of compounds (A) to (C)) exceeds $2{,}000 \times 10^{-6}$ mol/g, it tends to increase drastically. Thus, it is seen that by adjusting the amount of sulfur compound in the negative electrode active material to the amount specified by the present invention, it is possible to achieve both high input/output characteristics and high durability with low gas generation volume at high temperature.

Based on comparison between Examples 63 to 65 and the other examples, it is seen that adjustment of the amount of linear carbonate in the electrolyte to the amount specified according to the invention can achieve both higher input/output characteristics and high durability, with low gas generation at high temperature.

When a composite porous carbon material was used as the negative electrode active material, as a preferred embodiment of the invention, based on comparison with cases using graphite that is commonly used as a negative electrode active material for lithium ion secondary batteries (Comparative Examples 4 to 8), the power storage elements using composite porous carbon material containing a sulfur compound as the negative electrode active material, in an amount as specified according to the invention, behaved very differently than when using a negative electrode active material made of graphite. In other words, no critical relationship was seen between the sulfur compound amount and the input/output characteristic and durability of the power storage element in the case of graphite, but with a composite porous carbon material, a critical relationship was seen between the sulfur compound amount and the input/output characteristic and durability of the power storage element. This phenomenon is the manifestation of an effect that cannot be predicted from the prior art.

Thus, the power storage element of the invention is a non-aqueous lithium-type power storage element that can exhibit both high input/output characteristics and high durability with low gas generation at high temperature.

INDUSTRIAL APPLICABILITY

The non-aqueous lithium-type power storage element of the invention may be suitably used, for example, in the field of hybrid drive systems that combine automobile internal combustion engines, fuel cells or motors with power storage elements for automobiles, and in assist applications for instantaneous electric power peaks.

What is claimed is:
1. A non-aqueous lithium-type power storage element comprising an electrode laminate body comprising a negative electrode body, a positive electrode body and a separator, and a non-aqueous electrolyte, housed in an external body, wherein
the negative electrode body comprises a negative current collector, and a negative electrode active material layer that includes a negative electrode active material and that is provided on one or both surfaces of the negative current collector, the negative electrode active material (i) including a carbon material that can occlude and release lithium ions, and (ii) having a specific surface area of 262 m²/g or more as measured by the BET method,
the positive electrode body comprises a positive current collector, and a positive electrode active material layer that includes a positive electrode active material and that is provided on one or both surfaces of the positive current collector, the positive electrode active material including activated carbon,
the non-aqueous electrolyte contains a lithium salt at 0.5 mol/L or greater based on the total amount of the non-aqueous electrolyte,
the negative electrode active material layer includes at least one type of sulfur compound selected from the group consisting of sulfonic acid derivatives represented by the following formulas (1) and (2), and sulfurous acid derivatives represented by the following formulas (3) and (4), the total amount of sulfonic acid derivatives and sulfurous acid derivatives being 2.6× $10^{-6}$ mol/g to 2,000× $10^{-6}$ mol/g per unit weight of the negative electrode active material:

formula (1)

wherein in formula (1), $R^1$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^1$ represents hydrogen, lithium or a C1-12 alkyl group;

formula (2)

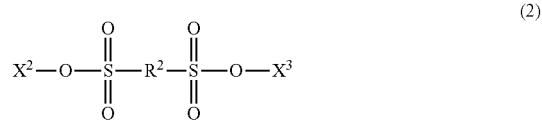

wherein in formula (2), $R^2$ represents a C1-24 alkyl group, a C1-24 mono or polyhydroxyalkyl group or its lithium alkoxide, a C2-24 alkenyl group, a C2-24 mono or polyhydroxyalkenyl group, a C3-6 cycloalkyl group, or an aryl group, and $X^2$ and $X^3$ each independently represent hydrogen, lithium or a C1-12 alkyl group;

formula (3)

wherein in formula (3), $R^3$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^4$ represents hydrogen, lithium or a C1-12 alkyl group; and formula (4)

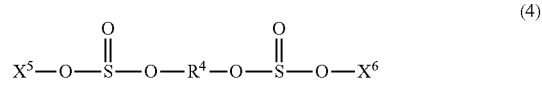

wherein in formula (4), $R^4$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^5$ and $X^6$ each independently represent hydrogen, lithium or a C1-12 alkyl group,
the negative electrode active material layer further includes at least one compound selected from the group consisting of
(i) $CH_3O$—$X^7$, wherein $X^7$ represents —$(COO)_n$Li (where n is 0 or 1), and (ii) $C_2H_5O-X^8$, wherein $X^8$ represents $-(COO)_nLi$ (where n is 0 or 1), at $7.8 \times 10^{-4}$ mol/g or less per unit weight of the negative electrode active material, the non-aqueous electrolyte contains at least one type of sultone compound represented by each of the following formulas (9) to (11), at 0.25 wt % to 20 wt % with respect to the total non-aqueous electrolyte:

formula (9)

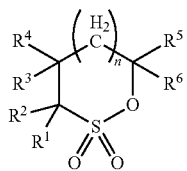

(9)

wherein in formula (9), $R^1$-$R^6$ each independently represent hydrogen, a halogen atom or a C1-12 alkyl group optionally including a halogen atom, and n is an integer of 0 to 3;

formula (10)

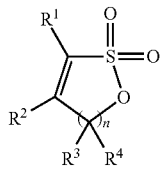

(10)

wherein in formula (10), $R^1$-$R^4$ each independently represent hydrogen, a halogen atom or a C1-12 alkyl group optionally including a halogen atom, and n is an integer of 0 to 3;

formula (11)

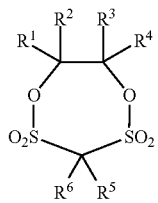

(11)

wherein in formula (11), $R^1$-$R^6$ each independently represent hydrogen, a halogen atom or a C1-6 alkyl group optionally including a halogen atom, the product of the electrostatic capacity F (F) and the internal resistance R (Ω) of the non-aqueous lithium-type power storage element RF (ΩF) is no greater than 2.4, and the gas quantity generated when the non-aqueous lithium-type power storage element has been stored for 2 months at a cell voltage of 4.0 V and in an environmental temperature of 60° C., is no greater than $13 \times 10^{-3}$ cc/F at 25° C.

2. A non-aqueous lithium-type power storage element according to claim 1, wherein
the compound represented by formula (9) is 1,3-propane sultone, 2,4-butane sultone, 1,4-butane sultone, 1,3-butane sultone or 2,4-pentane sultone, the compound represented by formula (10) is 1,3-propene sultone or 1,4-butene sultone, and the compound represented by formula (11) is 1,5,2,4-dioxadithiepane 2,2,4,4-tetraoxide (cyclodisone).

3. A non-aqueous lithium-type power storage element according to claim 1, wherein the non-aqueous electrolyte further contains at least one compound selected from the group consisting of
(i) phosphazenes represented by the following formula (12):

formula (12)

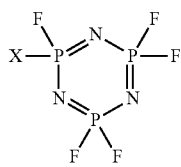

(12)

wherein in formula (12), X represents fluorine or an alkoxy or aryloxy group,
(ii) acyclic fluoroethers represented by the following formula (13):

$$R^1-O-R^2 \qquad (13),$$

wherein $R^1$ and $R^2$ each independently represent a C2-6 fluorinated alkyl group,
(iii) fluorine-containing cyclic carbonates, and
(iv) vinylene carbonate.

4. A non-aqueous lithium-type power storage element according to claim 1, wherein the lithium salt is $LiPF_6$.

5. A non-aqueous lithium-type power storage element according to claim 1, wherein the negative electrode active material satisfies the inequalities $0.010 \leq Vm1 \leq 0.250$, $0.001 \leq Vm2 \leq 0.200$ and $1.5 \leq Vm1/Vm2 \leq 20.0$, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

6. A non-aqueous lithium-type power storage element according to claim 1, wherein the negative electrode active material is a composite porous carbon material obtained by coating a surface of the activated carbon with a carbonaceous material.

7. A non-aqueous lithium-type power storage element according to claim 1, wherein
the sulfur compound is selected from among sulfonic acid derivatives represented by formula (1) and formula (2), and
in formula (1), $R^1$ represents a C1-24 alkyl group, C2-24 alkenyl group, C3-6 cycloalkyl group or aryl group, and $X^1$ represents hydrogen, lithium or a C1-12 alkyl group, and
in formula (2), $R^2$ represents a C1-24 alkyl group, C2-24 alkenyl group, C3-6 cycloalkyl group or aryl group, and $X^2$ and $X^3$ each independently represent hydrogen, lithium or a C1-12 alkyl group.

8. A non-aqueous lithium-type power storage element according to claim 1, wherein
the sulfur compound is a sulfonic acid derivative represented by formula (1), and
in formula (1), $R^1$ represents a C3-4 alkyl group, a C3-4 mono or polyhydroxyalkyl group or its lithium alkoxide, a C3-4 alkenyl group or a C3-4 mono or polyhydroxyalkenyl group or its lithium alkoxide, and $X^1$ represents hydrogen, lithium or a C1-2 alkyl group.

9. A non-aqueous lithium-type power storage element according to claim 1, wherein the sulfur compound is a sulfonic acid derivative selected from the group consisting of compounds represented by $C_3H_7SO_3X^1$ and $C_3H_5SO_3X^1$ wherein $X^1$ is hydrogen, lithium or a C1-2 alkyl group, and compounds represented by $X^2O_3SC_6H_{12}SO_3X^3$ and $X^2O_3SC_6H_8SO_3X^3$ wherein $X^2$ and $X^3$ each independently represent hydrogen, lithium or a C1-2 alkyl group.

10. A non-aqueous lithium-type power storage element according to claim 1, wherein the total amount of sulfur compounds in the negative electrode active material layer is $3.0\times10^{-6}$ mol/g to $870\times10^{-6}$ mol/g per unit weight of the negative electrode active material.

11. A non-aqueous lithium-type power storage element according to claim 1, wherein the total amount of sulfur compounds in the negative electrode active material layer is $15.7\times10^{-6}$ mol/g to $770\times10^{-6}$ mol/g per unit weight of the negative electrode active material.

12. A non-aqueous lithium-type power storage element according to claim 1, wherein the non-aqueous electrolyte contains a linear carbonate at 20 vol % or greater with respect to the total amount excluding lithium salts.

13. A non-aqueous lithium-type power storage element comprising an electrode laminate body comprising a negative electrode body, a positive electrode body and a separator, and a non-aqueous electrolyte, housed in an external body, wherein the negative electrode body comprises a negative current collector, and a negative electrode active material layer that includes a negative electrode active material and that is provided on one or both surfaces of the negative current collector, the negative electrode active material (i) including a carbon material that can occlude and release lithium ions, and (ii) having a specific surface area of 262 m²/g or more as measured by the BET method, the negative electrode active material is a composite porous material obtained by coating the surface of activated carbon with a carbonaceous material, the composite porous material is doped with lithium ion at between 1,050 mAh/g and 2,050 mAh/g, inclusive, per unit weight of the composite porous material, the weight ratio of the carbonaceous material with respect to the activated carbon is between 10% and 60%, inclusive, the thickness of the negative electrode active material layer is between 20 μm and 45 μm, inclusive, per side, the positive electrode body comprises a positive current collector, and a positive electrode active material layer that includes a positive electrode active material and that is provided on one or both surfaces of the positive current collector, the positive electrode active material including activated carbon, the non-aqueous electrolyte contains a lithium salt at 0.5 mol/L or greater based on the total amount of the non-aqueous electrolyte, the negative electrode active material layer includes at least one type of sulfur compound selected from the group consisting of sulfonic acid derivatives represented by the following formulas (1) and (2), and sulfurous acid derivatives represented by the following formulas (3) and (4), the total amount of sulfonic acid derivatives and sulfurous acid derivatives being $2.6\times10^{-6}$ mol/g to $2,000\times10^{-6}$ mol/g per unit weight of the negative electrode active material:

formula (1)

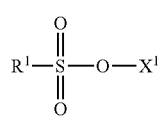

wherein in formula (1), $R^1$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^1$ represents hydrogen, lithium or a C1-12 alkyl group;

formula (2)

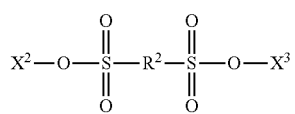

wherein in formula (2), $R^2$ represents a C1-24 alkyl group, a C1-24 mono or polyhydroxyalkyl group or its lithium alkoxide, a C2-24 alkenyl group, a C2-24 mono or polyhydroxyalkenyl group, a C3-6 cycloalkyl group, or an aryl group, and $X^2$ and $X^3$ each independently represent hydrogen, lithium or a C1-12 alkyl group;

formula (3)

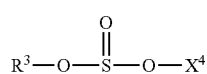

wherein in formula (3), $R^3$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^4$ represents hydrogen, lithium or a C1-12 alkyl group; and formula (4)

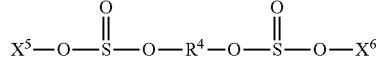

wherein in formula (4), $R^4$ represents a C1-24 alkyl group, a C1-24 mono or polyhydroxyalkyl group or its lithium alkoxide, a C2-24 alkenyl group, a C2-24 mono or polyhydroxyalkenyl group or its lithium alkoxide, a C3-6 cycloalkyl group, or an aryl group, and $X^5$ and $X^6$ each independently represent hydrogen, lithium or a C1-12 alkyl group, the non-aqueous electrolyte contains at least one type of sultone compound represented by each of the following formulas (9) to (11), at 0.25 wt % to 20 wt % with respect to the total non-aqueous electrolyte:

formula (9)

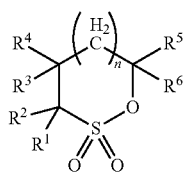

(9)

wherein in formula (9), $R^1$-$R^6$ each independently represent hydrogen, a halogen atom or a C1-12 alkyl group optionally including a halogen atom, and n is an integer of 0 to 3;

formula (10)

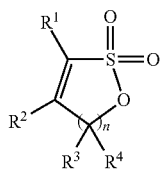

(10)

wherein in formula (10), $R^1$-$R^4$ each independently represent hydrogen, a halogen atom or a C1-12 alkyl group optionally including a halogen atom, and n is an integer of 0 to 3;

formula (11)

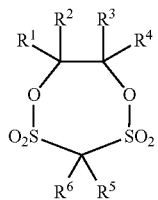

(11)

wherein in formula (11), $R^1$-$R^6$ each independently represent hydrogen, a halogen atom or a C1-6 alkyl group optionally including a halogen atom,
the product of the electrostatic capacity F (F) and the internal resistance R (Ω) of the non-aqueous lithium-type power storage element RF (ΩF) is no greater than 2.4, and
the gas quantity generated when the non-aqueous lithium-type power storage element has been stored for 2 months at a cell voltage of 4.0 V and in an environmental temperature of 60° C., is no greater than $13 \times 10^{-3}$ cc/F at 25° C.

14. A non-aqueous lithium-type power storage element according to claim 13, wherein the positive electrode active material is activated carbon satisfying the inequalities $0.3 < V1 \leq 0.8$ and $0.5 \leq V2 \leq 1.0$, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and having a specific surface area of between 1,500 m²/g and 3,000 m²/g, inclusive, as measured by the BET method.

15. A non-aqueous lithium-type power storage element according to claim 13, wherein the positive electrode active material is activated carbon in which the mesopore volume V1 (cc/g) due to pores with diameters of between 20 angstrom and 500 angstrom, inclusive, as calculated by the BJH method satisfies the inequality $0.8 < V1 \leq 2.5$, the micropore volume V2 (cc/g) due to pores with diameters of smaller than 20 angstrom as calculated by the MP method satisfies the inequality $0.8 < V2 \leq 3.0$, and a specific surface area is between 3,000 m²/g and 4,000 m²/g, inclusive, as measured by the BET method.

16. A non-aqueous lithium-type power storage element according to claim 13, wherein
the sulfur compound is selected from among sulfonic acid derivatives represented by formula (1) and formula (2), and
in formula (1), $R^1$ represents a C1-24 alkyl group, C2-24 alkenyl group, C3-6 cycloalkyl group or aryl group, and $X^1$ represents hydrogen, lithium or a C1-12 alkyl group, and
in formula (2), $R^2$ represents a C1-24 alkyl group, C2-24 alkenyl group, C3-6 cycloalkyl group or aryl group, and $X^2$ and $X^3$ each independently represent hydrogen, lithium or a C1-12 alkyl group.

17. A non-aqueous lithium-type power storage element according to claim 13, wherein
the sulfur compound is a sulfonic acid derivative represented by formula (1), and
in formula (1), $R^1$ represents a C3-4 alkyl group, a C3-4 mono or polyhydroxyalkyl group or its lithium alkoxide, a C3-4 alkenyl group or a C3-4 mono or polyhydroxyalkenyl group or its lithium alkoxide, and $X^1$ represents hydrogen, lithium or a C1-2 alkyl group.

18. A non-aqueous lithium-type power storage element according to claim 13, wherein the sulfur compound is a sulfonic acid derivative selected from the group consisting of
compounds represented by $C_3H_7SO_3X^1$ and $C_3H_5SO_3X^1$ wherein $X^1$ is hydrogen, lithium or a C1-2 alkyl group, and
compounds represented by $X^2O_3SC_6H_{12}SO_3X^3$ and $X^2O_3SC_6H_8SO_3X^3$ wherein $X^2$ and $X^3$ each independently represent hydrogen, lithium or a C1-2 alkyl group.

19. A non-aqueous lithium-type power storage element according to claim 13, wherein the total amount of sulfur compounds in the negative electrode active material layer is $3.0 \times 10^{-6}$ mol/g to $870 \times 10^{-6}$ mol/g per unit weight of the negative electrode active material.

20. A non-aqueous lithium-type power storage element according to claim 13, wherein the total amount of sulfur compounds in the negative electrode active material layer is $15.7 \times 10^{-6}$ mol/g to $770 \times 10^{-6}$ mol/g per unit weight of the negative electrode active material.

21. A non-aqueous lithium-type power storage element according to claim 13, wherein the non-aqueous electrolyte contains a linear carbonate at 20 vol % or greater with respect to the total amount excluding lithium salts.

22. A non-aqueous lithium-type power storage element according to claim 13, wherein
the compound represented by formula (9) is 1,3-propane sultone, 2,4-butane sultone, 1,4-butane sultone, 1,3-butane sultone or 2,4-pentane sultone,
the compound represented by formula (10) is 1,3-propene sultone or 1,4-butene sultone, and
the compound represented by formula (11) is 1,5,2,4-dioxadithiepane 2,2,4,4-tetraoxide (cyclodisone).

23. A non-aqueous lithium-type power storage element according to claim 13, wherein
the non-aqueous electrolyte further contains at least one compound selected from the group consisting of
(i) phosphazenes represented by the following formula (12):

formula (12)

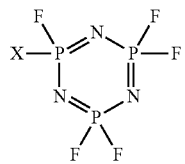
(12)

wherein in formula (12), X represents fluorine or an alkoxy or aryloxy group, (ii) acyclic fluoroethers represented by the following formula (13):

$R^1$—O—$R^2$ (13), wherein $R^1$ and $R^2$ each independently represent a C2-6 fluorinated alkyl group, (iii) fluorine-containing cyclic carbonates, and
(iv) vinylene carbonate.

24. A non-aqueous lithium-type power storage element according to claim 13, wherein the lithium salt is $LiPF_6$.

* * * * *